(12) United States Patent
Borselli et al.

(10) Patent No.: US 7,528,403 B1
(45) Date of Patent: May 5, 2009

(54) HYBRID SILICON-ON-INSULATOR WAVEGUIDE DEVICES

(75) Inventors: Matthew Borselli, Los Angeles, CA (US); Thomas J Johnson, Pasadena, CA (US); Oskar Painter, Sierra Madre, CA (US)

(73) Assignee: California Institute of Technology, Pasadena, CA (US)

( * ) Notice: Subject to any disclaimer, the term of this patent is extended or adjusted under 35 U.S.C. 154(b) by 229 days.

(21) Appl. No.: 11/411,447

(22) Filed: Apr. 25, 2006

Related U.S. Application Data

(60) Provisional application No. 60/674,564, filed on Apr. 25, 2005.

(51) Int. Cl.
| | |
|---|---|
| H01L 29/06 | (2006.01) |
| H01L 31/0328 | (2006.01) |
| H01L 31/0336 | (2006.01) |
| H01L 31/072 | (2006.01) |
| H01L 31/109 | (2006.01) |
| H01L 27/15 | (2006.01) |
| H01L 29/26 | (2006.01) |
| H01L 31/12 | (2006.01) |
| H01L 33/00 | (2006.01) |
| H01L 29/22 | (2006.01) |
| H01L 29/24 | (2006.01) |

(52) U.S. Cl. .............................. 257/25; 257/13; 257/79; 257/94; 257/101; 257/102; 257/103; 257/623; 257/E25.028; 257/E33.005; 257/E33.008; 257/E33.009; 257/E33.067; 257/E33.069

(58) Field of Classification Search ................... 257/13, 257/79, 94, 101–103, 25, 623, E25.028, E33.005, 257/E33.008, E33.009, E33.067, E33.069
See application file for complete search history.

(56) References Cited

U.S. PATENT DOCUMENTS

| | | | | |
|---|---|---|---|---|
| 5,422,305 | A | * | 6/1995 | Seabaugh et al. ........... 438/480 |
| 6,040,590 | A | | 3/2000 | O'Brien et al. |
| 6,399,407 | B1 | | 6/2002 | O'Brien et al. |
| 6,433,399 | B1 | * | 8/2002 | Polman et al. .............. 257/432 |
| 6,656,761 | B2 | * | 12/2003 | Csutak et al. ................. 438/57 |
| 6,759,010 | B2 | | 7/2004 | Lewis et al. |
| 6,803,840 | B2 | * | 10/2004 | Hunt et al. ................... 333/186 |
| 6,828,598 | B1 | * | 12/2004 | Coffa et al. .................. 257/102 |
| 6,831,938 | B1 | | 12/2004 | Gunn, III |
| 6,849,914 | B2 | * | 2/2005 | Day ........................... 257/431 |
| 7,440,180 | B2 | * | 10/2008 | Tang ........................... 359/344 |
| 2004/0190826 | A1 | * | 9/2004 | Ghiron et al. ................ 385/36 |
| 2005/0094938 | A1 | * | 5/2005 | Ghiron et al. ................ 385/36 |
| 2005/0196114 | A1 | * | 9/2005 | Xu et al. ..................... 385/123 |
| 2007/0134838 | A1 | * | 6/2007 | Gamand ...................... 438/50 |

(Continued)

OTHER PUBLICATIONS

Aarts, I.M.P., et al., "Direct and highly sensitive measurement of defect-related absorption in amorphous silicon thin films by cavity ringdown spectroscopy," *Applied Physics Letters*, 84(16):3079-3081, Apr. 2004.

(Continued)

*Primary Examiner*—Ida M Soward
(74) *Attorney, Agent, or Firm*—Fish & Richardson P.C.

(57) ABSTRACT

Device designs and techniques for providing efficient hybrid silicon-on-insulator devices where a silicon waveguide core or resonator is clad by the insulator and a top functional cladding layer in some implementations of the designs.

15 Claims, 21 Drawing Sheets

U.S. PATENT DOCUMENTS

2008/0089367 A1    4/2008    Srinivasan et al.

OTHER PUBLICATIONS

Amato, G., et al., "Gap-states distribution in amorphous-silicon films as obtained by photothermal deflection spectroscopy," *Physical Review B*, 45(24):14108-14113, Jun. 1992.

Blood, P., "On the Dimensionality of Optical Absorption, Gain, and Recombination in Quantum-Confined Structures," *IEEE Journal of Quantum Electronics*, 36(3):354-362, Mar. 2000.

Borselli, M., et al., "Beyond the Rayleigh scattering limit in high-$Q$ silicon microdisks: theory and experiment," *Optics Express*, 13(5):1515-1530, Mar. 2005.

Borselli, M., et al., "Measuring the role of surface chemistry in silicon microphotonics," *Applied Physics Letters*, 88(13):131114.1-131114.3, Mar. 2006.

Borselli, M., et al., "Rayleigh scattering, mode coupling, and optical loss in silicon microdisks," *Applied Physics Letters*, 85(17):3693-3695, Oct. 2004.

Boyraz, O., et al., "Demonstration of a silicon Raman laser," *Optics Express*, 12(21):5269-5273, Oct. 2004.

Chabal, Y., et al., "Infrared spectroscopy of Si(111) and Si(100) surfaces after HF treatment: Hydrogen termination and surface morphology," *The Journal of Vacuum Science and Technology A*, 7(3):2104-2109, May 1989.

Chantre, A., et al., "Deep-level optical spectroscopy in GaAs," *Physical Review B*, 23(10):5335-5359, May 1981.

Fenner, D.B., et al., "Silicon surface passivation by hydrogen termination: A comparative study of preparation methods," *Journal of Applied Physics*, 66(1):419-424, Jul. 1989.

Gorodetsky, M., et al., "Rayleigh scattering in high-$Q$ microspheres," *Journal of Optical Society of America B*, 17(6):1051-1057, Jun. 2000.

Jackson, W.B., et al., "Direct measurement of gap-state absorption in hydrogenated amorphous silicon by photothermal deflection spectroscopy," *Physical Review B*, 25(8):5559-5562, Apr. 1982.

Kobayashi, H., et al., "Interface states at ultrathin oxide/Si(111) interfaces obtained from x-ray photoelectron spectroscopy measurements under biases," *Applied Physics Letters*, 69(15):2276-2278, Oct. 1996.

Lang, D.V., et al., "Deep-level transient spectroscopy: A new method to characterize traps in semiconductors," *Journal of Applied Physics*, 45(7):3023-3032, Jul. 1974.

Linnros, J., "Carrier lifetime measurements using free carrier absorption transients. II. Lifetime mapping and effects of surface recombination," *Journal of Applied Physics*, 84(1):284-291, Jul. 1998.

Little, B.E., et al., "Surface-roughness-induced contradirectional coupling in ring and disk resonators," *Optics Letters*, 22(1):4-6, Jan. 1997.

Liu, A., et al., "A high-speed silicon optical modulator based on a metal-oxide-semiconductor capacitor," *Nature*, 427(6975):615-618, Feb. 2004.

Lonergan, M.C., et al., "Array-Based Vapor Sensing Using Chemically Sensitive, Carbon Black-Polymer Resistors," *Chemistry of Materials*, 8(9):2298-2312, (1996).

McCann, M., et al., "Surface Passivation by Rehydrogenation of Silicon-nitride-coated Silicon Wafers," *Progress in Photovoltaics: Research and Applications*, 13(3):195-200, Nov. 2004.

Muller, D.A., "A sound barrier for silicon?," *Nature Materials*, 4(9):645-647, Sep. 2005.

Petitdidier, S., et al., "Growth mechanism and characterization of chemical oxide films produced in peroxide mixtures on Si(100) surfaces," *Thin Solid Films*, 476(1):51-58, Apr. 2005.

Rong, H., et al., "A continuous-wave Raman silicon laser," *Nature*, 433(7027):725-728, Feb. 2005.

Salib, M., et al., "Silicon Photonics," *Intel Technology Journal*, 8(2):146-160, May 2004.

Schmidt, J., et al., "Surface passivation of silicon solar cells using plasma-enhanced chemical-vapour-deposited SiN films and thin thermal $SiO_2$/plasma SiN stacks," *Semiconductor Science and Technology*, 16(3):164-170, Mar. 2001.

Song, B.S., et al., "Ultra-high-$Q$ photonic double-heterostructure nanocavity," *Nature Materials*, 4(3):207-210, Mar. 2005.

Sparacin, D.K., et al., "Silicon Waveguide Sidewall Smoothing by Wet Chemical Oxidation," *Journal of Lightwave Technology*, 23(8):2455-2461, Aug. 2005.

Spillane, S.M., et al., "Ultrahigh-$Q$ toroidal microresonators for cavity quantum electrodynamics," *Physical Review A*, 71(1):013817.1-013817.10, Jan. 2005.

Tanabe, T., et al., "Fast bistable all-optical switch and memory on a silicon photonic crystal on-chip," *Optics Letters*, 30(19):2575-2577, Oct. 2005.

Xu, Q., et al., "Micrometre-scale silicon electro-optic modulator," *Nature*, 435(7040):325-327, May 2005.

Yamashita, Y., et al., "Spectroscopic observation of interface states of ultrathin silicon oxide," *Journal of Applied Physics*, 79(9):7051-7057, May 1996.

Yang, L., et al., "Erbium-doped and Raman microlasers on a silicon chip fabricated by the sol-gel process," *Applied Physics Letters*, 86(9):091114.1-091114.3, Feb. 2005.

\* cited by examiner

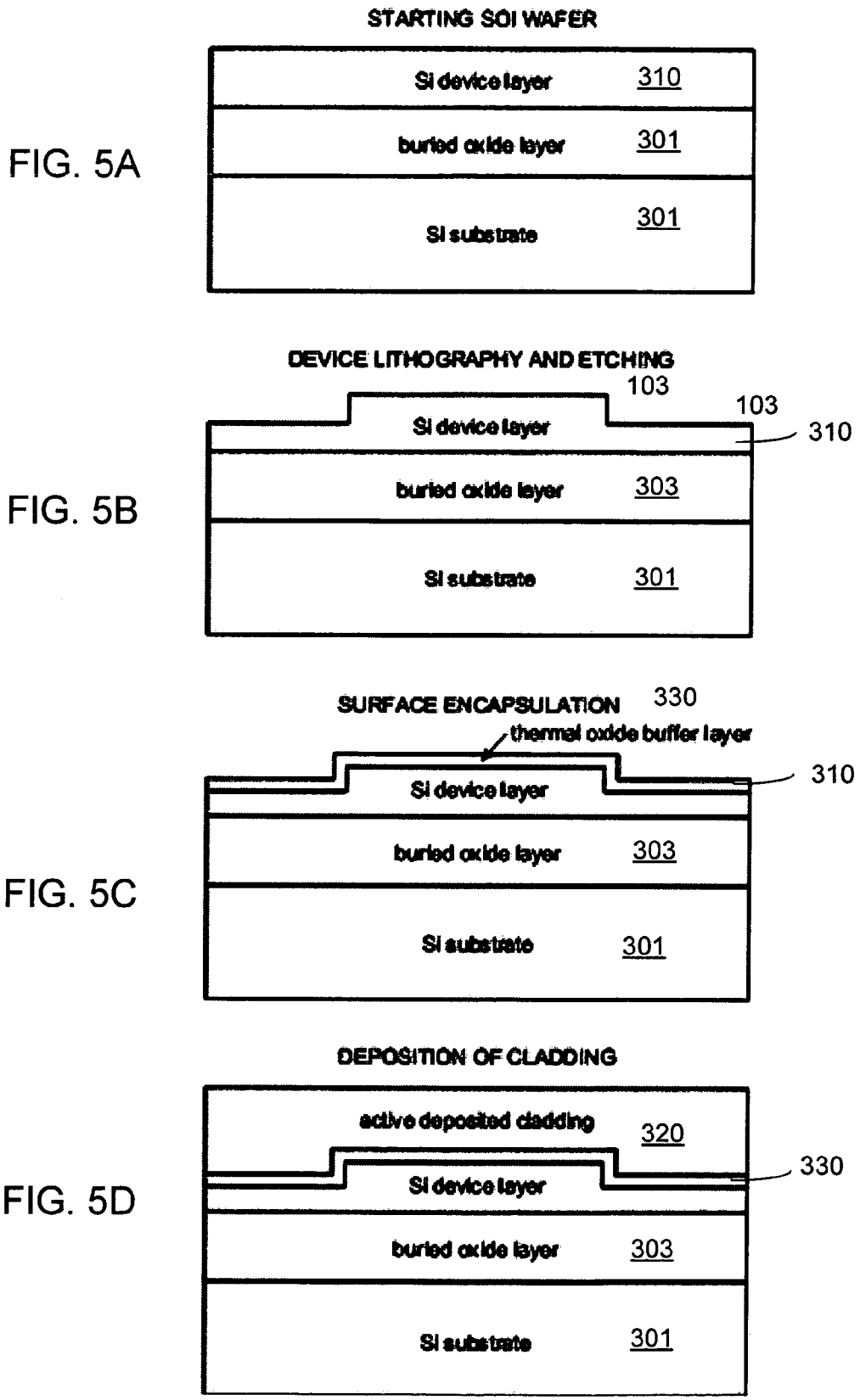

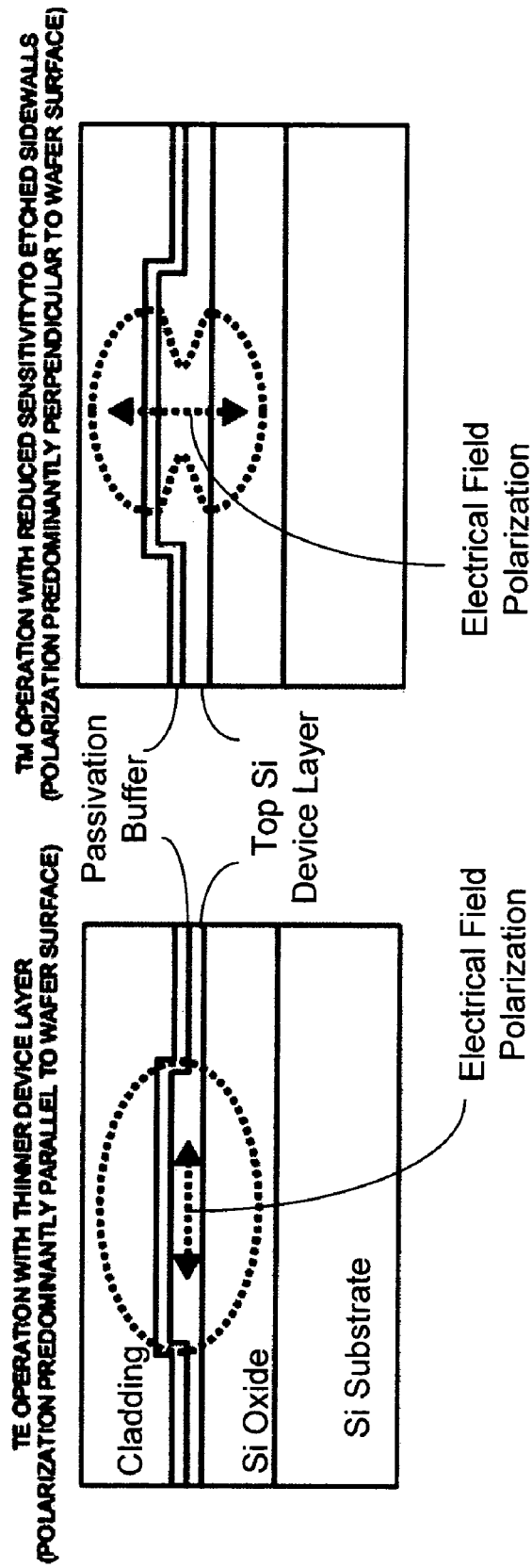

HYBRID SILICON-ON-INSULATOR WAVEGUIDE DEVICES

This application claims the benefit of U.S. Provisional Application No. 60/674,564 entitled "Hybrid SOI Waveguide" and filed Apr. 25, 2005, which is incorporated by reference as part of the specification of this application.

BACKGROUND

This application relates to devices built on silicon to include photonic structures and other microstructures.

Technologies for silicon-based integrated circuits and other microfabricated structures are well developed and are still developing to allow for fabrication of a wide range of microstructured devices and systems, such as integrated circuits, microprocessors, various Micro-Electro-Mechanical Systems (MEMS) and photonic circuits. Integration of silicon with photonic devices has been under extensive research and development to integrate silicon-based structures, devices and materials with photonic devices and elements that generate, guide, control, modulate, or detect light. Silicon-on-insulator structures may be used to fabricate various photonic devices over a silicon substrate and to integrate silicon electronics such as CMOS circuits on the same silicon platform with the photonic devices.

SUMMARY

This application describes Device designs and techniques for providing efficient hybrid silicon-on-insulator devices where a silicon waveguide core or resonator is clad by the insulator and a top functional cladding layer in some implementations of the designs. These and other implementations and other features are described in greater detail in the drawings, the detailed description and the claims.

BRIEF DESCRIPTION OF DRAWINGS

FIGS. 5A, 5B, 5C and 5D show an example of the fabrication process for making the device in FIG. 3.

FIGS. 6A and 6B illustrate the TE and TM modes in the device in FIG. 3.

FIG. 10A: Spatial dependence of $|E(p,Z)|^2$ for $\Gamma_{Si}$=0.28 (highlighted by gray bar in FIG. 10B. FIG. 10B: Fraction of electric energy in each dielectric component versus buffer layer thickness (and equivalent remaining silicon core).

DETAILED DESCRIPTION

Figure 1:
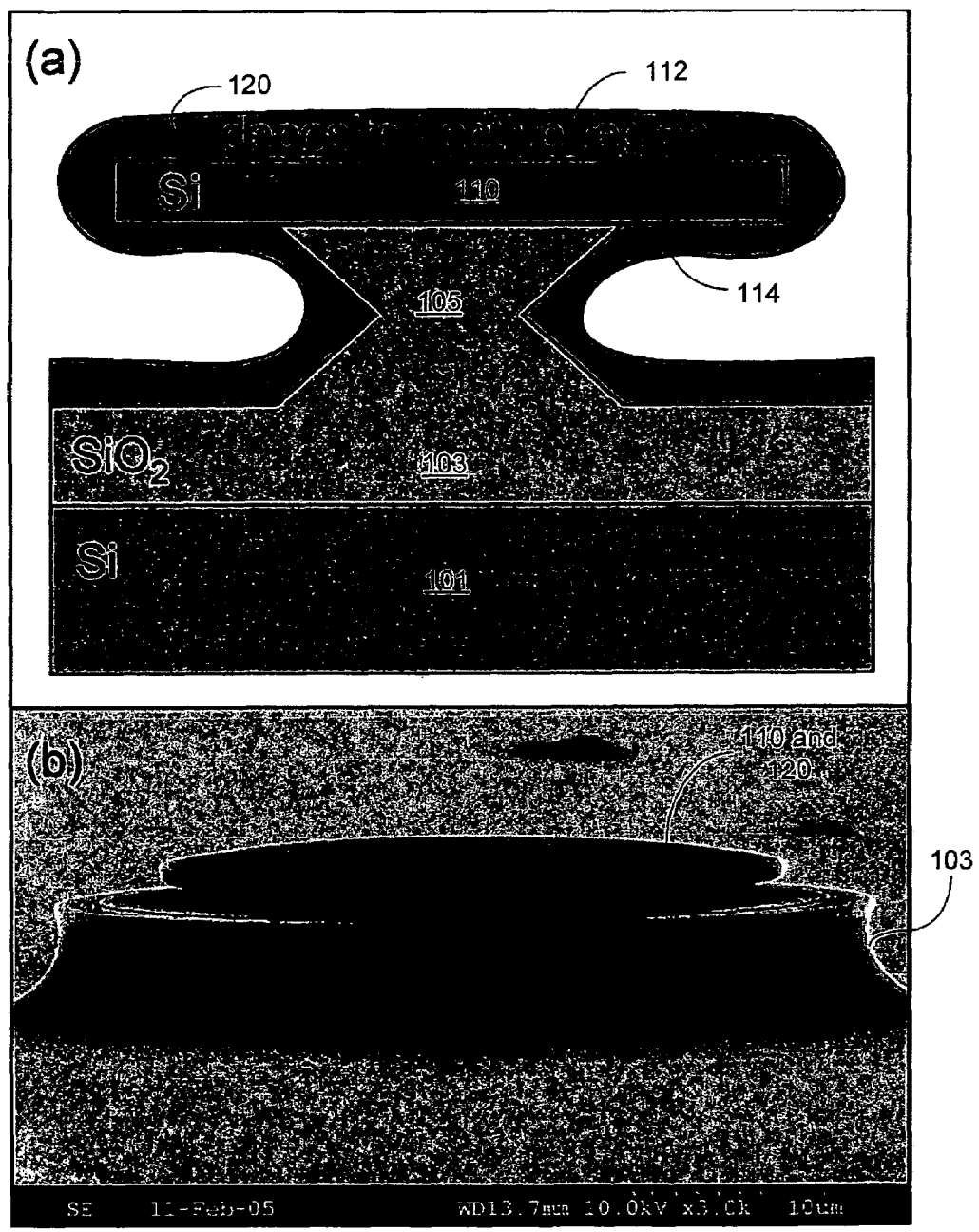
FIG. 1(a) Schematic representation of a silicon-on-insulator microdisk with deposited active region material. (b) SEM image of a fabricated SOI microdisk with a PECVD deposited $SiO_2$ cladding.

Silicon has a high index of about 3.55 and thus large fractions of energy can be pushed outside the silicon region via the evanescent field of the light inside the silicon for interaction with the environment on SOI structures. The structures and techniques described in this application can be implemented on SOI structures by using an optical silicon resonator or waveguide to confine or guide light and a functional optical cladding outside the silicon resonator or waveguide to interact with the evanescent field of the confined or guided light. In many implementations, the functional cladding material over the silicon resonator or waveguide is different from silicon and thus combines with the SOI structure to form a hybrid SOI (HySOI) system. The silicon optical resonator or waveguide is designed to be capable of displacing a significant fraction of the energy from the silicon into the engineered cladding while maintaining the best qualities of silicon as an opto-electronic material. The cladding of the HySOI resonator or waveguide can be functionalized in a variety of ways for applications which benefit from large field intensities in the cladding, including but not limited to functionalized biological and chemical sensors, lasers, and non-linear optical components.

As an example, one device described in this application includes a silicon substrate, an insulator layer formed on the silicon substrate, and a silicon resonator separated from the silicon substrate and in contact with the insulator layer. The silicon resonator includes a silicon resonator surface that is not in contact with the insulator layer and includes at least a portion that is parallel to the silicon substrate or forms an acute angle with respect to the silicon substrate. The silicon resonator is configured and operable to confine light in a resonator mode that has a portion extending outside the silicon resonator at the silicon resonator surface. In addition, this device includes a cladding layer which has at least a portion directly in contact with or near the silicon resonator surface to interact with the confined light. Notably, the silicon resonator surface through which the confined light in the silicon resonator extends outside the silicon resonator includes at least a portion that is parallel to or forms an acute angle with the silicon substrate. Hence, the coupling is along a direction approximately perpendicular to the silicon substrate. Such a silicon surface can be fabricated with a high precision in geometry and dimensions (e.g., the silicon thickness) and high surface smoothness using proven silicon processing, e.g., photolithographic processing. Accordingly, the HySOI structure can be precisely engineered to provide the efficient optical coupling with small optical loss.

By comparison, in some other microfabricated photonic devices, an optical interface surface that is substantially perpendicular to the silicon substrate (e.g., a side wall of a silicon waveguide) is used for the lateral evanescent coupling between a silicon waveguide or resonator and a cladding or an external layer. In these devices, the evanescent coupling is along a direction that is substantially parallel to the underlying silicon substrate. The surface quality of the side wall can be difficult to control using the standard silicon processing and therefore the coupling efficiency and the device performance may be compromised or degraded by the surface quality of the side wall of the silicon resonator or waveguide.

Tests and measurements conducted in the course of the development of the techniques described in this application suggest that the quality of the silicon surface that is substantially parallel to or forms an acute angle with respect to the silicon substrate may be ensured by using post-patterning processes in addition to the precisely controlled the patterning processes (e.g., photolithographic processing). For example, wet chemistry processing may be used as a post-patterning process to passivate the silicon surface states, thus preventing absorption at the operating optical wavelengths, e.g., telecommunications wavelengths. The wet chemistry processing may include piranha oxidation by using heated sulfuric acid and hydrogen peroxide to clean the surface and to grow an initial oxide on the surface, and a dipping in a dilute hydrofluoric acid to remove the piranha oxide and terminate the dangling Si bonds with hydrogen. After completion of the silicon surface, a passivation buffer layer, e.g., a thin thermal oxidation layer, may be formed on the silicon surface to protect the high quality and sensitive or fragile silicon surface from contaminants in subsequent fabrication processes.

The HySOI waveguide is based around the advanced silicon-on-insulator (SOI) material systems where a wafer of crystalline silicon of any orientation and doping density is thermally or otherwise oxidized to form an insulating layer of oxide beneath the surface of the silicon, forming a three layer material of silicon, silicon oxide, and silicon. The SOI can be used to create lithographically defined optical structures for optical frequencies approximately extending from 3 to 270 THz including but not limited to: resonators, optical modulators, optical light sources, optical amplifiers, waveguides, couplers, wavelength multiplexers and de-multiplexers. Proper design of the silicon elements can displace large fractions of the optical energy into a deposited functional cladding without sacrificing electrical functionality. The TM mode of operation with dominant component of the electric field polarization being perpendicular to the top surface of the SOI may be used to enhance the optical interaction with the functional cladding outside the silicon resonator or waveguide.

FIG. 1 shows an example of a HySOI device where a silicon layer 110 formed over an insulator layer 103 of the SOI structure having a silicon substrate 101 and a silicon dioxide layer as the insulator layer 103 is patterned into a microdisk resonator. The silicon dioxide layer 103 is "buried" under the top silicon layer 110 and thus is sometimes referred to as a buried oxide (BOX) layer. The microdisk resonator is shaped as a whispering gallery mode (WGM) resonator to support whispering gallery (WG) resonator modes circulating around the rim of the microdisk resonator. In this particular example, the silicon dioxide layer 103 is patterned to include a pedestal 105 to support the silicon microdisk resonator 110 and to expose a portion of the bottom resonator surface 114. The evanescent field of a WG mode extends outside the top silicon resonator surface 112 and the bottom silicon resonator surface 114 near the rim. A functional cladding layer 120 is formed on the silicon microdisk resonator 110 to cover, at least, the silicon surfaces 112 and 114. A scanning electron microscope image of the HySOI structure is also shown in the bottom portion of FIG. 1. The cladding layer 120 may contain a laser gain medium so the HySOI structure may be an optical amplifier or a laser resonator.

The cladding layer 120 may be formed by using various processes, including the Plasma Enhanced Chemical Vapor Deposition (PECVD). The cladding layer 120 may be functionalized for specific purposes. In one embodiment, the cladding material can be a thin layer with specific or non-specific receptors for a chemical or biological sensing environment. The silicon microdisk 110 may be lithographically defined and etched into the top silicon layer, providing a low loss optical resonator. The resulting resonator can then be coated with an active material in the frequency range of interest to provide optical gain under either optical pumping or electrical pumping for optical amplification, optical modulation, lasing and other applications.

Figure 2:
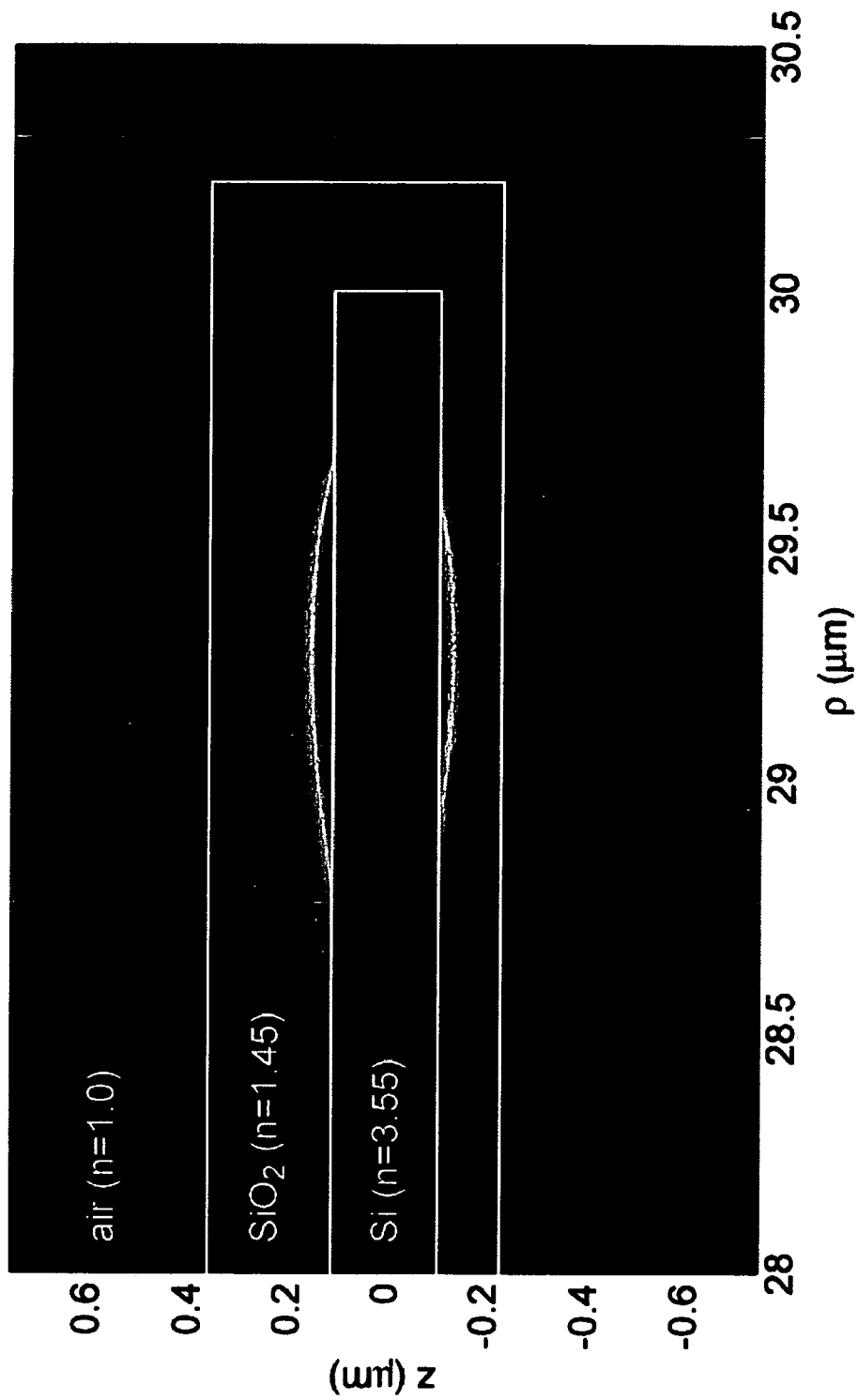
FIG. 2 shows absolute value square of the total electric field from a Finite Element Method simulation of a whispering gallery mode of a silicon microdisk with glass cladding. This calculation shows that 68% of the energy resides in the silicon while 28% of the energy is inside the glass cladding. Note also that minimal optical energy resides at the lateral sidewall of the microdisk.

In operation, the device in FIG. 1 may be operated in the TM mode where the dominant component of the electric field polarization is perpendicular to the top surface of the SOI. The use of the TM mode increases the optical energy overlap between the cladding layer 120 and the silicon microdisk resonator in the silicon layer at both the top and bottom silicon surfaces 112 and 114. FIG. 2 shows the spatial field distribution as the map of the absolute value square of the total electric field from a Finite Element Method simulation of a whispering gallery mode of the silicon microdisk with a silicon dioxide glass cladding as the cladding layer 120. The vertical axis is the distance in microns perpendicular to the silicon substrate and the horizontal axis is the distance in microns. This calculation shows that 68% of the energy resides in the silicon microdisk while 28% of the energy is inside the glass cladding. Notably, in the TM mode operation, the minimal optical energy resides at the lateral sidewall of the microdisk. Because the top and bottom silicon resonator surfaces support the majority of the evanescent coupling of each whispering gallery mode of the microdisk, the surface quality of the top and bottom silicon resonator surfaces is important.

Hence, in this and some other implementations, the TM polarization may be used to enhance the energy overlap with the active material around the top silicon layer as well as decreasing the sensitivity to fabrication induced imperfections in the lateral sidewall. The top silicon layer thickness is an important device parameter to the proper design of the HySOI waveguide. The thickness should be chosen with careful consideration of various factors, including a) maximizing energy overlap with the surrounding gain region, b) Minimizing sources of optical loss, c) retaining enough energy in top silicon for modulation and trimming, and d) retaining integration potential with other silicon photonic elements.

For the specific case of operation in the important telecommunication frequency range of approximately 170 to 230 THz, an SOI microdisk laser may be configured to include a cladding having a glass active region doped with Erbium (Er) ions or other ions as the optical gain medium, a radius for the microdisk ranging from 1 to 100 microns, a top silicon thickness ranging from 0.2 to 0.3 microns, a buried oxide (BOX) thickness greater than 0.5 microns, and a top silicon impurity doping densities less than $10^{16}$ cm$^{-3}$. The silicon microdisk may use a surface tension limited etch mask formed by raising the temperature beyond its melting point. Creating a surface tension limited etch mask is commonly referred as "reflowing a resist" and can be used to reduce the amount of optical loss caused by energy conserving Rayleigh scattering into other optical modes including bound and radiating optical modes.

The above and other HySOI waveguide and resonators described in this application can be implemented in a way that circumvents the material limitations of silicon by properly engineering the energy overlap of the optical modes with a functional cladding. In addition, the above and other HySOI waveguide designs in this application can be implemented to avoid excess optical losses by displacing the optical field from lateral sidewalls that may have etch or other forms of damage.

In some other silicon photonic devices, notch silicon waveguides are formed by removing small portions of the central silicon guiding region and provide evanescent coupling via the side walls formed b the removal. These devices can suffer from large fabrication induced surface effects, including scattering and absorption. Pushing the optical energy to the top of the SOI circumvents this problem because the top silicon surface can be prepared to an epitaxial ready quality before the fabrication begins.

An example of the importance of maximizing optical energy in a functional cladding of Si and minimizing the optical energy in other "lossy" regions of the waveguide is the generation of a Si-based laser optical source. Some Raman based silicon lasers may suffer from a variety of technological problems that the designs presented here overcome. First, the gain bandwidth of the Raman effect is approximately 0.1 THz, making it impractical as a broadband light amplification source, such as is currently required in the telecom arena. Second, the nonlinear generation of Stokes photons is only efficient at extremely high intensities (tens of mW/cm2). In some implementations, this condition necessitates an elaborate voltage biasing system for removal of two-photon absorption (TPA) induced free-carriers which would otherwise result in device failure (no amplification, no lasing) due to free-carrier absorption (FCA). The HySOI waveguide using a rare earth doped glass (such as erbium doped silicon dioxide described in the preferred embodiment) as an active cladding circumvents the aforementioned problems. The gain region of rare earth doped glass has a bandwidth of over 5 THz, and is already widely deployed as an active material in optical fiber amplifiers. Notably, the rare earth doped glass amplification process can be made efficient by properly designing the thickness of the top silicon layer of the SOI structure, resulting in a high energy overlap with the rare earth doped glass. Overlap factors of greater than 25% are possible with Er doped oxide overcladding in the proposed HySOI waveguide design, which is crucial due to the relatively low material gain of Er doped oxide glasses (1 dB/cm is typical). This large overlap factor thus enables significant light amplification in the HySOI resonator waveguide. It is also of the utmost importance that the optical losses be limited in the HySOI waveguide or resonator, again due to the relatively small material gain of Er doped glass. The HySOI waveguide design described here naturally does this by "pushing" the optical field into the overcladding above and below the ultra-smooth top and bottom surfaces of the Si layer of the SOI, and "pulling" it from the fabricated (and possibly damaged or roughened) lateral sidewalls of the waveguide or resonator. Losses below 0.1 dB/cm have been demonstrated in the HySOI waveguide of a microdisk resonator, a factor of more than 10 improvement in previous methods described in the technical literature. With further optimization (through using lower doped Si layers in the SOI), losses below 0.01 dB/cm may be achieved. The combination of both high net gain (due to large overlap with Er doped silicon oxide glass) and low loss allows for broadband amplification of light, and if placed in a resonant geometry, lasing action. Note that lasing action could also occur at low input pump powers in the HySOI waveguide as the optical loss is conservatively only 0.1 dB/cm, and the maximum net gain could be conservatively as high as 0.2 dB/cm, which means the system would need to be pumped to only half of its maximum gain to obtain lasing (lasing occurs roughly when net gain equals net loss). Another feature of the HySOI waveguide devices is maintaining the compatibility with high volume manufacturing (HVM) silicon CMOS processing with comparable or better device performance relative to other lasers using Er-doped silicon dioxide microspheres and microtoroids.

In the example shown in FIG. 1, a silicon microdisk resonator is formed in the top silicon layer over the SOI structure. Other resonator geometries may also be used for the silicon resonator in the top silicon layer. For example, the silicon microdisk may be used as an internal storage of optical energy for purposes of feedback or as a narrowband high reflectivity mirror as one component of an external cavity laser. Furthermore, the disk structure may be replaced with circular or racetrack style ring resonators or a straight waveguide with partially reflective inputs/outputs forming a Fabry-Perot cavity.

The optical gain material for the cladding may be a rare earth doped glass as described in the above examples that can be deposited by the PECVD or any other material deposition or bonding which preserves the HVM silicon CMOS compatibility. Other dopants may be used to provide the optical gain, such as non-Er dopants in silicon dioxide glass, III-V based semiconductors bonded to the top silicon layer, Si—Ge heterostructures, silicon nanocrystals embedded in a low loss material with rare-earth dopants, porous silicon, or polymer-based materials.

The pumping of the gain cladding layer may use the optical pumping scheme where a pump laser with a wavelength shorter than the laser wavelength is used for pumping in, e.g., Er-doped glass lasers and amplifiers. The III-V semiconductors or advanced materials such as embedded silicon nanocrystals or Si—Ge may be used in the HySOI waveguide as the cladding material to allow for electrical pumping of the cladding gain material by the direct electrical injection. Lasers based on the HySOI designs in this application can couple a significant fraction of the energy inside the active cladding for efficient laser generations and provide HVM ready silicon-on-insulator optical sources that are electrically tunable while being capable of delivering technologically relevant power levels with broadband gain.

Figure 3:
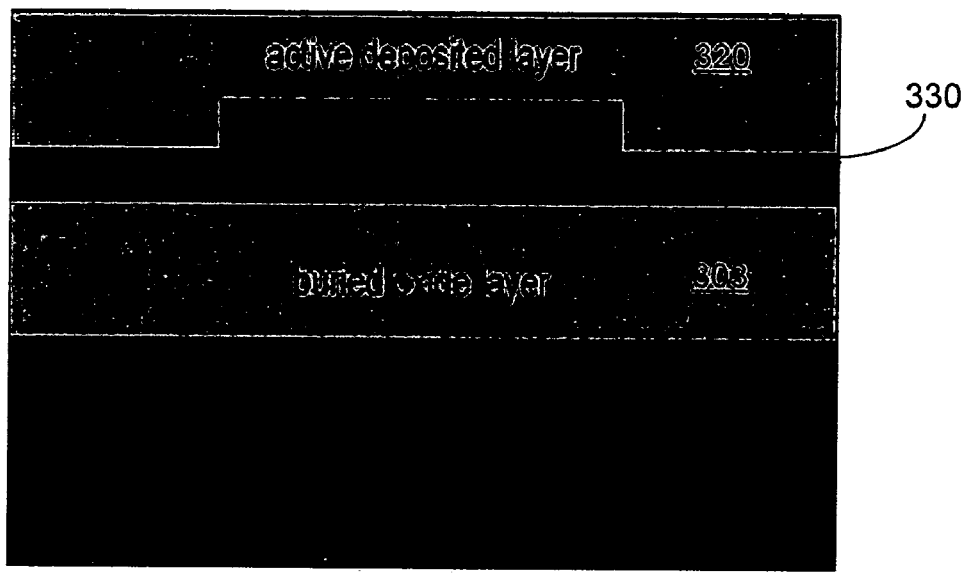
FIGS. 3 and 4 show two examples of HySOI devices.
Figure 4:
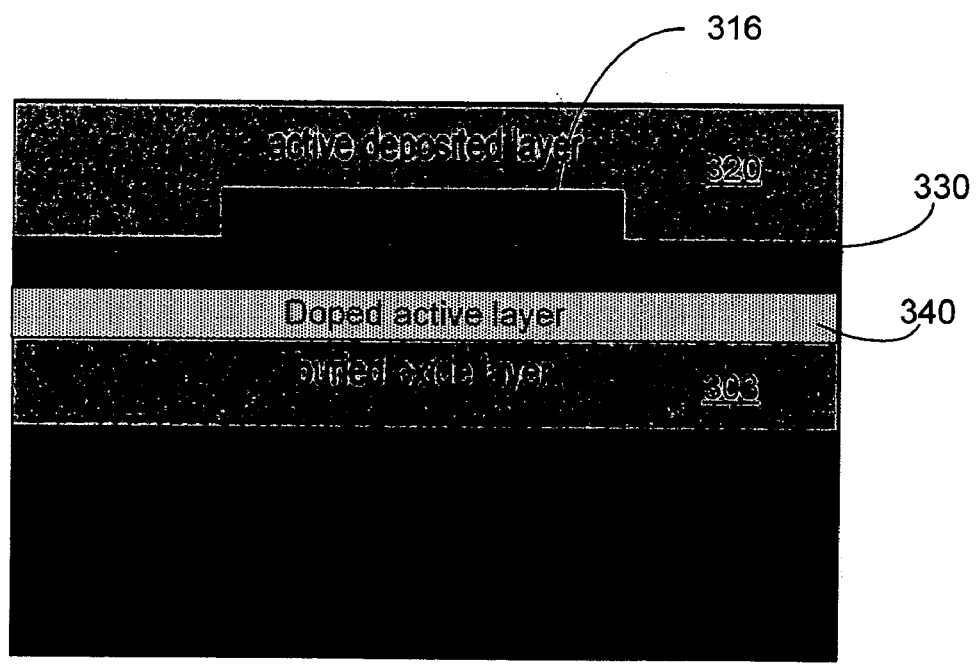

In addition to the design in FIG. 1, other HySOI configurations can be implemented. FIGS. 3 and 4 show two examples where the silicon layer 310 on top of the insulator layer 303 on the silicon substrate 301 in HySOI systems is directly placed on and in full contact with the insulator layer 301 without the pedestal-like structure 105 shown in FIG. 1. The silicon layer 310 is the silicon device layer and is patterned in a patterning process during the fabrication to form a protruded silicon structure 316 to form an optical resonator or waveguide. Examples of the protruded structure 316 include but are not limited to a WGM disk resonator, a closed ring waveguide resonator (e.g., a circular or racetrack ring), and a Fabry-Perot resonator having the protruded silicon structure 316 as the intracavity waveguide and two end reflectors or partial reflectors to reflect light therebetween in the protruded silicon structure 316. In these and other configurations for the protruded silicon structure 316, the confined or guided light has an evanescent field that extends outside the protruded silicon structure 316 through its top and bottom silicon surfaces. Either one or both of the evanescent fields above the top silicon surface and the bottom surface of the protruded silicon structure 316 can be utilized to amplify, modulate or modify the light confined or guided in the protruded silicon structure 316 by using at least a functional cladding layer 320 formed over the protruded silicon structure 316 and the silicon layer 310.

In addition to the top functional cladding layer 320, the evanescent field extending through the bottom silicon surface towards the BOX layer 303 may also be used. As illustrated in FIG. 4, a bottom functional cladding layer 340 may be formed below the silicon layer 310 to interact with the evanescent field of the confined or guided light extending through the bottom silicon surface and operate in combination with the top functional cladding layer 320. As an example, the top and bottom functional cladding layers 320 and 340 may be doped active gain layers for generating or amplifying light under optical or electrical excitation. In fabrication of the HySOI device in FIG. 4, the bottom functional layer 340 may be formed by depositing a separate layer over the BOX layer 303 before forming the silicon layer 310. Alternatively, the bottom functional layer 340 may be formed by doping a top portion of the BOX layer 303 by, e.g., ion implantation. As a specific example, Er ions may be implanted into the BOX layer 303 to form an Er-doped gain layer 340 in the silicon dioxide layer 303.

In regions away from the immediate vicinity of the protruded silicon structure 316, electrical dopants may be added to form various IC structures that are used as electronics associated with the operations or functions of the optical resonator or waveguide formed in the protruded silicon structure 316 or other electronic circuits.

The material composition of the bottom layer 303 may be crystalline silicon and can be oxidized to form the buried oxide layer (BOX) as a high quality electrical insulator by thermally oxidizing crystalline silicon or other oxidation processes. As described above, a gain material may be added into the otherwise passive BOX layer 303 through, e.g., ion implantation of active ions. The Si device layer 310 is crystalline silicon that of a sufficiently high resistivity to be optically transparent for telecommunications wavelengths (>1 Ohm-cm). The active material in the top cladding layer 320 may be a vapor deposited glass with rare-earth dopants, e.g., an erbium-doped multicomponent glass that is physically vapor deposited (PVD).

The silicon surface of the protruded silicon structure 316 is carefully engineered to provide a high quality surface in the final completed HySOI device. The silicon surface may be further processed and treated with a wet chemistry process after the patterning. In some implementations, the top silicon surface of the patterned silicon layer 310 may be passivated or encapsulated by forming a thin passivation buffer layer 330 as shown in FIGS. 3 and 4. This layer 330 isolates and protects the finished high-quality and sensitive silicon surface from contamination from subsequent fabrication processes and contaminants that may penetrate to the silicon surface during the life of the device. For example, a thin layer of a silicon oxide or silicon nitride may be formed as the passivation buffer layer 330. In one implementation, the thermal oxidation may be performed within about 30 minutes of the final wet chemical treatments in order to prevent "native oxide" from forming on the silicon surface which destroys the Q. The thermal oxide may be controlled to be greater than about 5 nm to prevent future native oxidation. The thermal oxide may be thicker than 5 nm to prevent diffusion of contaminants onto the silicon surface (e.g. erbium ions diffusing out of the glass host and onto the Si surface). A long high temperature anneal at a range of 1000-1100° C. may be performed after the oxidation in order to release the stress at the Si—SiO$_2$ interface and allow for low-reducing atomic reconfigurations.

FIGS. 5A-5D illustrate an exemplary fabrication steps for fabricating the HySOI device shown in FIG. 3 by processing an SOI structure.

The described HySOI devices may be operated with either TE mode or TM mode for the confined or guided light in the silicon resonator or waveguide formed in the top silicon layer. The TE mode and TM mode have orthogonal electrical polarizations and have very different spatial distributions and behaviors at the silicon surface. The described HySOI devices can operate more efficiently by using the TM polarization than the TE polarization in part because the silicon resonator or waveguide in the top silicon layer can be designed to push optical energy up along a direction perpendicular to the silicon substrate across the high-quality wafer surface rather than some other designs using photonic crystals, notch-waveguide resonators, extremely laterally narrow waveguide resonators to push the optical energy laterally along the silicon substrate across the low-quality etched side surfaces or side walls. For operating at the wavelength around 1550 nm, the devices may be configured with the following considerations for the TM or TE operation: the silicon disk resonator or ring resonator may be made to have a radius greater than 2.5 microns in some implementations or sized to preserve radiation quality factor $Q>10^8$; the silicon waveguide width (e.g., the lateral width of the protruded silicon structure 316 in FIGS. 3 and 4) of a silicon ring resonator may be greater than 0.8 micron to mitigate the effect of the second etched surface; and the height of the protruded silicon structure silicon structure 316 in FIGS. 3 and 4 may be greater than 50 nm if electrical modulation is desired.

Figure 6C:
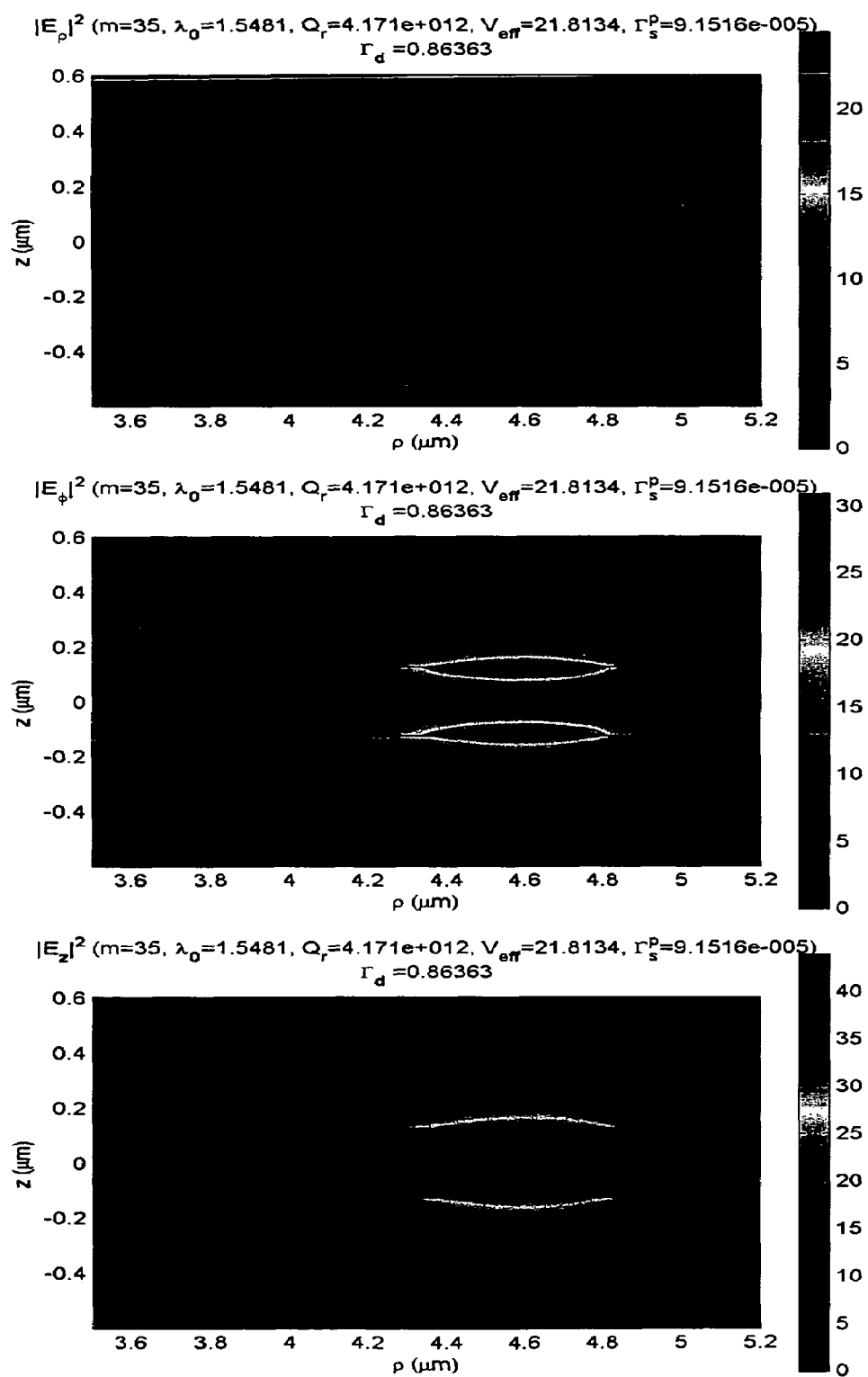
FIG. 6C shows the spatial field amplitude squared distributions of a TM mode.

FIGS. 6A and 6B illustrate the spatial distributions (dash-line regions) and their electrical polarizations (double arrowed lines) in the HySOI device shown in FIG. 3. For the TM mode, FIG. 6C further shows plots of the absolute value squared (commonly referred to as "intensity") of each of the three electric field components for a "TM" microdisk in cylindrical coordinates using a finite-element simulation performed with Comsol's Femlab 3.1. The unoptimized parameters used for this finite-element simulation are: radius=5 um, height=0.25 um, and index of refraction 3.48 for silicon.

As described above, the surface properties of the top silicon surface for the silicon resonator or waveguide in the described HySOI devices are important to the performance of the devices. Careful characterization and engineering of the top silicon surface make the described HySOI devices practical for commercial applications. Historically, studies of Si surface and interface states have primarily focused on their electronic properties. The following sections use a specially designed microdisk optical resonator as an example to study the optical properties of silicon surfaces typical in silicon-on-insulator (SOI) microphotonic elements in a noninvasive, rapid, and sensitive manner. Various aspects in the following sections are described in by Borselli et al. in "Measuring the role of surface chemistry in silicon microphotonics," Applied Physics Letters, Vol. 88 (2006), which is incorporated by reference as part of the specification of this application.

Figure 7:
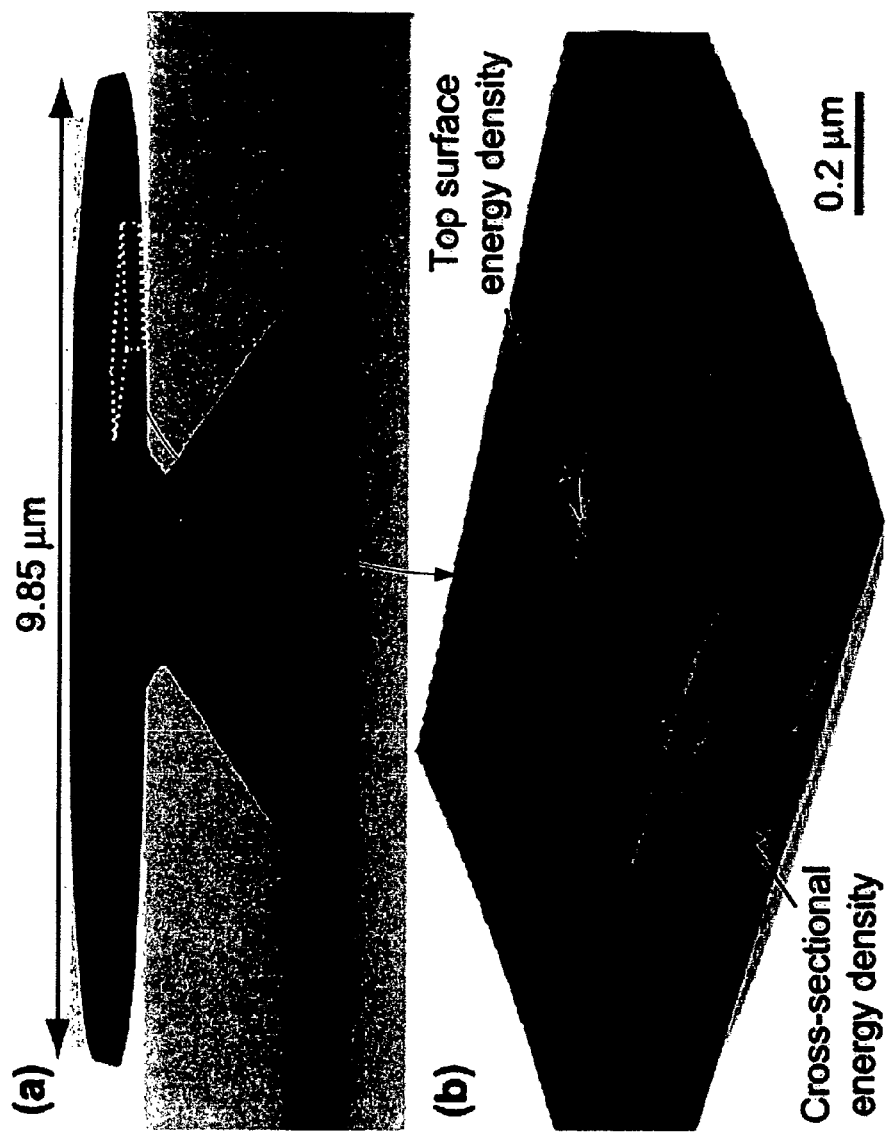
FIG. 7 shows (a) SEM micrograph of a 5 μm radius SOI microdisk. (b) Zoomed-in representation of disk edge (white dashed box) showing a surface-sensitive TM polarized whispering gallery mode solved via FEM.

Shown in FIG. 7, the high quality factor (Q) Si microdisk resonators used in this work provide surface-specific optical sensitivity due to the strong overlap of the top and bottom surfaces of the active Si layer with the electric field energy density of appropriately polarized bound optical modes of the microdisk.

A normalized measure of surface sensitivity for a guided-wave mode in a waveguide or resonator can be defined as $\Gamma'_s \equiv \Gamma_s/t_s$, where $\Gamma_s$ is the fractional electric field energy overlap with a surface perturbation of physical depth $t_s$. If optical loss is dominated by interactions with the surface, then the modal loss coefficient per unit length ($\alpha_m$) measured from experiment can be related to a fractional loss per pass through the surface given by $\alpha'_s = \alpha_m/\Gamma'_s [=(2\pi n_g)/(\lambda_0 Q\Gamma')]$, for a resonator with quality factor Q and modal group index of refraction $n_g$]. For a true two-dimensional surface in which the perturbation depth is infinitesimal, $\alpha'_s$, is the most relevant quantity describing the surface and is equivalent to the fraction of power lost for a normal incident plane wave propagating across the surface. From finite-element method (FEM) simulations shown in FIG. 7, the transverse magnetic (TM) polarization whispering gallery modes (WGMs) of the microdisk are ~90× more sensitive to the top and bottom <100> Si surfaces than the etched sidewall at the microdisk periphery; specifically, $\Gamma'_{top}=\Gamma'_{top}=3.5\times10^{-3}$ nm$^{-1}$ and $\Gamma'_{side}=8.1\times10^{-5}$ nm$^{-1}$. This implies that ~0.2% of the optical mode exists in a single monolayer at the top (bottom) Si surface, while little of the mode sees imperfections at the microdisk perimeter. For the measured devices described below (Q~$1.5\times10^6$), a surface absorption of one-tenth of the full linewidth was measurable, corresponding to a sensitivity limit of $\alpha'_s \sim 10^{-7}$.

The silicon microdisks used in the measurements described here were fabricated from a SOI wafer from SOI-TEC, consisting of a 217 nm thick silicon device layer (p-type, 14-22 Ω cm resistivity, <100> orientation) with a 2 μm SiO$_2$, buried oxide (BOX) layer. Microdisks of 5 μm radius were fabricated,[16] finishing with a 10 min acetone soak and piranha etch to remove organic materials. A 1 h dilute hydrofluoric acid (HF) solution comprised of five parts 18.3 MΩ de-ionized (DI) water to one concentrated aqueous HF (49%) was used to remove a protective SIN$_x$ cap and partially undercut the disk, as shown in the scanning electron microscope (SEM) micrograph in FIG. 7(a). The wafer was then rinsed in de-ionized water, with nitrogen (N$_2$), and immediately transferred into a N$_2$ purged testing enclosure.

Figure 8A:
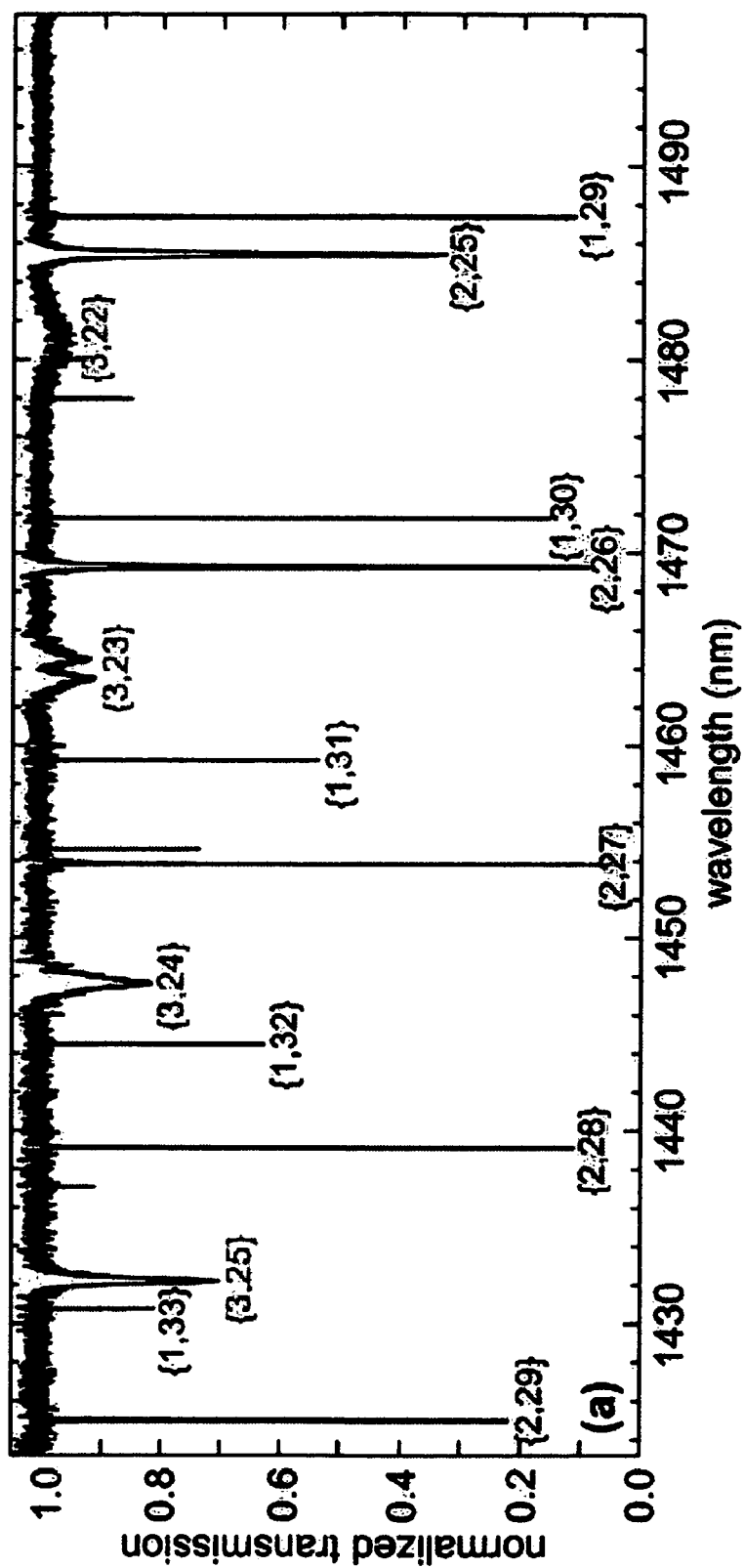
FIGS. 8A, 8B and 8C show a normalized spectral transmission response of Si microdisk resonations. 8A: Broad scan across λ=1400 nm band for a 5 μm radius microdisk with the fiber taper placed 0.6±0.1 μm away from the disk edge and optimized for TM coupling. The spectrum was normalized to the response of the fiber taper moved 3 μm laterally away from the disk edge. 8B: High resolution scan of the $TM_{1,31}$ mode at λ=1459 nm in 8A Δλ and δλ indicate the CW/CCW mode splitting and individual mode linewidth, respectively. 8C: Electric energy density plot and high resolution scan of a 40 μm radius microdisk, showing the reduced loss of a bulk TE WGM.

The microdisk resonators were characterized using a swept-wavelength external-cavity laser (New Focus Velocity, λ=1420–1498 nm, linewidth<300 kHz) connected to a fiber taper waveguide probe.[17] A fiber-based Mach-Zehnder interferometer was used to calibrate the high resolution, piezocontrolled wavelength scans to ±0.01 pm linewidth accuracy. The micron-scale fiber taper probe was formed from a standard single-mode optical fiber and was used to evanescently excite the WGMs of the microdisk with controllable loading. FIG. 8A shows the normalized spectral transmission response of a 5 μm radius microdisk resonator, illustrating clear families of modes having similar linewidth, δλ, and free spectral range (FSR). By comparison to FEM simulations of the Si microdisk, each mode in FIG. 8A was categorized and labeled as TM$_{p,m}$, where p and m are the radial and azimuthal numbers, respectively.

Figures 8B, 8C:
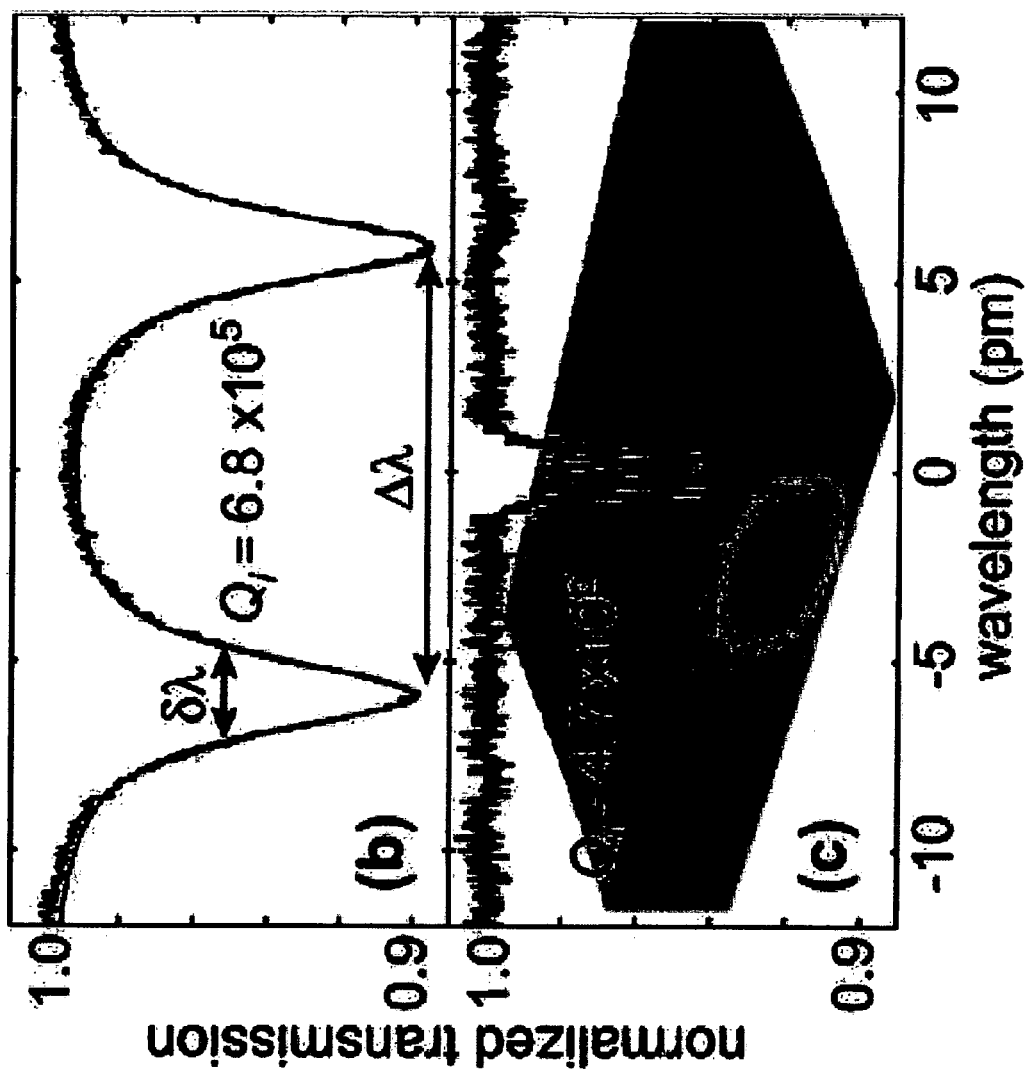

Owing to their large surface sensitivity (see FIG. 7), the spectral signature of the TM$_{1,m}$ modes was used to determine the quality of the optical surfaces. FIG. 8B shows a high resolution scan across the TM$_{1,31}$ mode. The observed double resonance dip, termed a doublet, is a result of surface roughness coupling of the normally degenerate clockwise (CW) and counter-clockwise (CCW) propagating WGMs. The rate at which photons are backscattered is quantified by the doublet splitting, Δλ, while the rate at which photons are lost from the resonator is quantified by the intrinsic linewidth, δλ, of the individual doublet modes. From a fit to the transmission spectrum of FIG. 8B, Δλ=11.9 pm and δλ=2.2 pm, corresponding to an intrinsic modal quality factor of $Q_i=\lambda_0/\delta\lambda=6.8\times10^5$ for this TM$_{1,31}$ mode. should be contrasted with the electric field energy density plot and transmission spectrum shown in FIG. 8C for a more confined, and less surface sensitive, TE WGM of a much larger 40 μm radius microdisk ($\Gamma'_{top}=\Gamma'_{bot}=1.2\times10^{-3}$ nm$^{-1}$ and $\Gamma'_{side}=2.3\times10^{-5}$ nm$^{-1}$). From the fit parameters (Δλ=0.8 pm, δλ=0.3 pm), the Q of the buried TE mode is $Q_i=4.7\times10^6$, corresponding to a loss per unit length of $\alpha_i=0.13$ dB/cm. This is nearly an order of magnitude smaller optical loss than that of the as-processed TM$_{1,m}$ modes, and provides an upper bound on the bulk Si optical loss of the SOI material.

The stark difference between the surface-sensitive TM and bulk TE modes indicates that the as-processed Si surfaces are far from optimal. Etch-induced surface damage on the microdisk sidewall can only account for a small fraction of this difference due to the enhanced sensitivity of the TM$_{1,m}$ to the top and bottom Si surfaces (comparison of the TM and TE modes in the same microdisk and with similar modal overlap with the microdisk edge bear this out). Damage to the top and bottom Si surfaces can stem from a variety of possible sources including chemical mechanical polishing, native oxide formation during storage, or adventitious organic matter. In an attempt to repair the Si surfaces a series of chemical oxidation treatments were performed on the devices. The well-known process of repeated chemical oxidation in piranha ($H_2SO_4$/$H_2O_2$) and HF oxide stripping was employed to controllably prepare the Si surfaces. Three cycles of the piranha/HF process, recipe shown in Table I, were applied to the as-processed devices. From the blueshift in the WGM resonances due to the three cycles of the piranha/HF process, an estimated 1.9±0.1 nm of Si was removed from the surface of the microdisk. The fit to the $TM_{1,31}$ transmission spectrum, shown in FIG. 9($b$), indicates that a significant improvement to the surfaces has also taken place, yielding a $\Delta\lambda$=7.2 pm and $\delta\lambda$=1.1 pm.

TABLE I

Summary of piranha oxidation surface treatment.

| Step | Composition[a] | Temp. | Time |
| --- | --- | --- | --- |
| Piranha | 3:1 $H_2SO_4$/$H_2O_2$ | 100° C. | 10 min |
| 3 X rinse | DI $H_2O$ | 23° C. | 30 s |
| HF dip | 10:1 $H_2O$/HF | 23° C. | 1 min |
| 2 X rinse | DI $H_2O$ | 23° C. | 15 s |

[a]Standard concentration aqueous solutions.

Figures 9A, 9B, 9C, 9D:
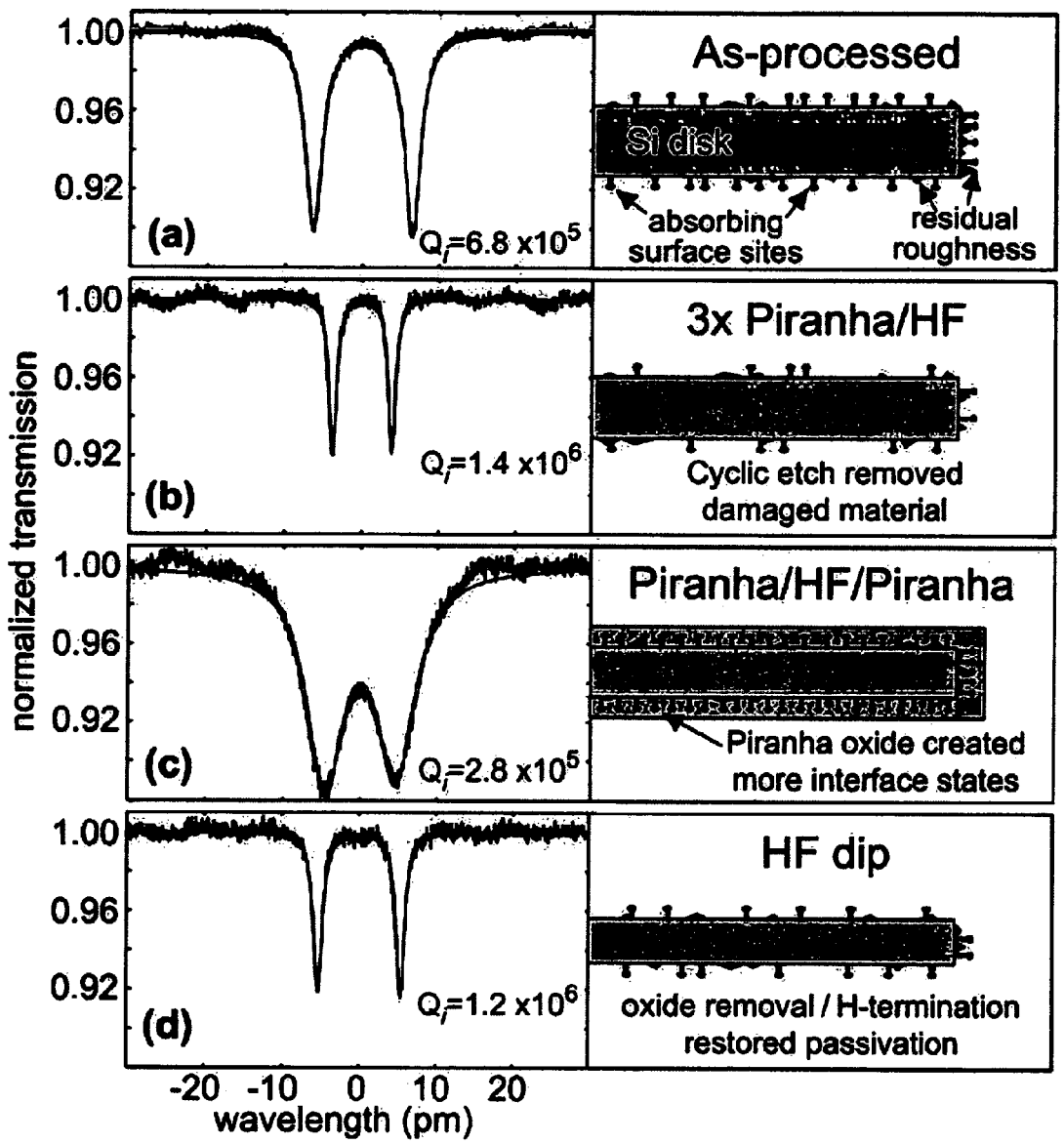
FIGS. 9(a), 9(b), 9(c), 9(d) and 9(e) show wavelength scans of the $TM_{1,31}$ doublet mode after each chemical treatment and accompanying schematic of chemical treatment. (a) As-processed, (b) triple piranha/Hf cycle (Table I). (c) single piranha/HF/piranha step allowing measurement of piranha oxide, and (d) HF dip to remove chemical oxide from previous treatment and restore passivation. (e) Average intrinsic linewidth, δλ, and average doublet-splitting, Δλ, for all $TM_{l,m}$ modes within the 1420-1470 nm spectrum after each chemical treatment step.
Figure 9E:
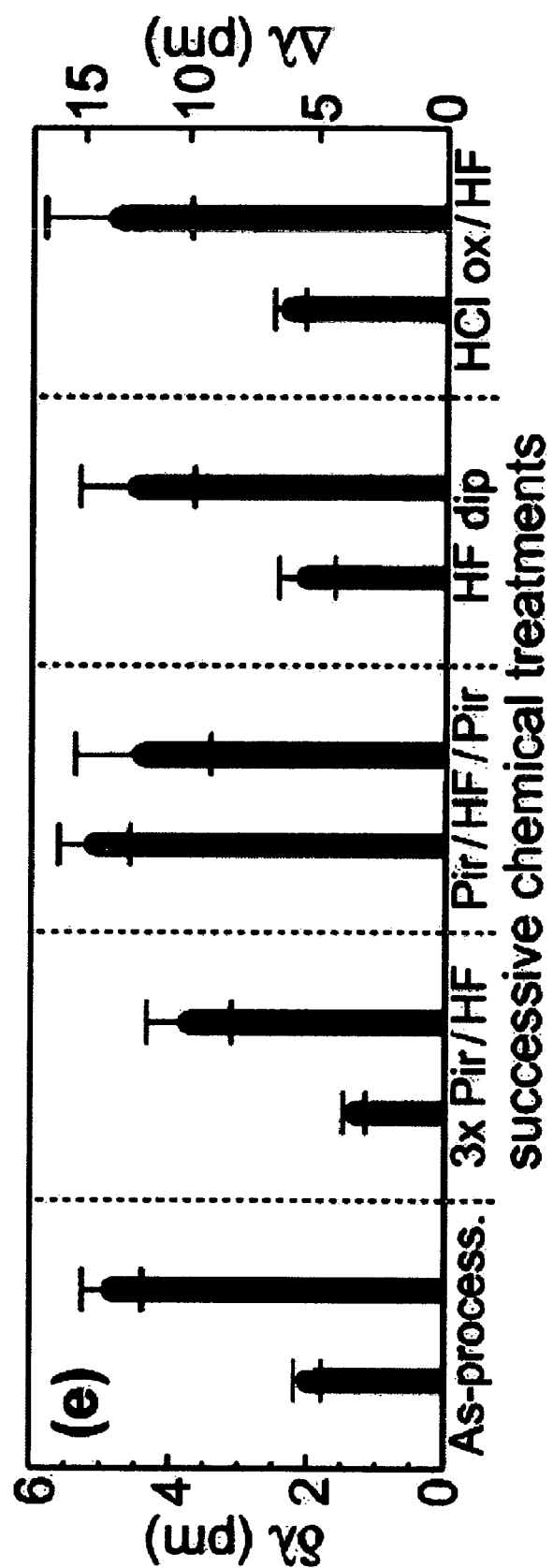

To separate the effects of the piranha oxidation and the HF etch, the sample was put through a piranha/HF/piranha treatment. The first cycle of piranha/HF was used to "refresh" the hydrogen passivation before reoxidizing the Si surface with piranha. FIG. 9($c$) shows the fit to the now barely resolvable $TM_{1,31}$ doublet yielding $\Delta\lambda$=9.7 pm and $\delta\lambda$=5.6 pm. The fivefold increase in linewidth and a negligible increase in doublet splitting is indicative of a significant activation of absorbing surface states without an increase in surface scattering. Removing the chemical oxide with the HF dip listed in Table I and retesting indicated that an oxide film equivalent to 2.8±0.1 nm of $SiO_2$ had been present. The fit to the transmission spectrum of the $TM_{1,31}$ mode in FIG. 9($d$) yielded fit parameters $\Delta\lambda$=9.7 pm and $\delta\lambda$=1.2 pm, showing that the optical damage to the Si surfaces caused by piranha oxidation was reversible.

As a final treatment to the 5 μm radii microdisks, we used the same 3× oxidation and stripping process as described in Table I, but with a HCl based chemistry (8:1:2 $H_2O$:HCl; $H_2O_2$, heated to 60° C.) instead of the $H_2SO_4$ based chemistry. FIG. 9($e$) shows a graphical representation of the average behavior of all $TM_{l,m}$ modes in the 1420-1470 nm span after each chemical treatment. The results revealed that the HCl oxidation was slightly less effective at passivating the silicon surface than the piranha oxidation; however, it is expected that the optimum solution for chemical oxidation will depend upon the Si crystal orientation and previous chemical treatments.

Although it has recently been observed that repeated chemical oxidation and removal of silicon can provide a smoothing action on etched sidewalls, the large shifts in optical loss with chemical treatment described above can be linked to surface-state absorption as opposed to surface scattering. Whereas the highly confined Si waveguide measurements to date have been sensitive to changes in loss as low as 1 dB/cm, the microdisks of this work are sensitive to changes of loss more than an order of magnitude smaller (<0.03 dB/cm) where surface chemistry is more likely to play a role. Indeed, as mentioned above the TM-polarized microdisk WGMs are selectively sensitive to the top and bottom Si surfaces which are extremely smooth in comparison with etched surfaces. The negligible change in average mode splitting, $\Delta\lambda$, with chemical treatment [FIG. 9($e$)] is also indicative of little change in surface roughness. A complementary analysis[25] of power dependent transmission scans showed that ~50% of residual optical loss, after piranha/HF treatment and hydrogen surface passivation, is still due to surface-state absorption (bulk absorption is negligible at this level).

By comparing the cavity Q before and after the piranha oxide removal, a fractional surface absorption loss per pass of $\alpha'_{s,ox}$~X $10^{-5}$ is estimated for the piranha oxide. This large fractional absorption in the $\lambda$=1400 nm wavelength band ($\hbar\omega$~eV) is attributed to single-photon absorption by midgap interface states. Such electronic interface states at the Si/(piranha) $SiO_x$ interface have been observed in Ref. 26, with three sets of state-density maxima in the band gap of silicon occurring at 0.3, 0.5, and 0.7 eV referenced to the valence-bond maximum, with a Fermi energy of ~eV. Thus, our observed surface absorption is most likely dominated by the transition from the filled 0.3 eV surface-state band to the conduction band at 1.1 eV. In comparison, the model absorption loss of the hydrogen-passivated Si surface was measuer[25] to be as small as $\alpha^H_m$~0.8 $cm^{-1}$, corresponding to a fractional surface absorption loss per pass of $\alpha'_{S,H}$~1×$10^{-6}$ for the top (bottom) Si active layer surface.

All of the measurements described above were performed in a $N_2$ purged environment over several weeks. Even in such an environment, however, changes in the hydrogen passivated surfaces were observed over times as short as a few days. Left in an unprotected air environment, degradation of the optical surface quality was evident in a matter of hours. Research and development of stable surface passivation techniques optimized for optical quality, akin to the gate oxides of CMOS microelectronics, will be a key ingredient in the future development of Si photonics. Our data suggest that surface chemistry as much as surface roughness will ultimately limit the performance of Si microphotonic devices, and further development of Si passivation techniques should be able to reduce optical losses by as much as an order of magnitude (towards the bulk c-Si limit) while improving the stability and manufacturability of future Si photonic components.

The following sections describe examples of lasers using the HySOI structures described in this application.

In order to achieve lasing action, the associated optimal cavity designs must satisfy several requirements similar to any laser, including possessing a low threshold and high external efficiency. From a design perspective, a good rule of thumb is that the available gain of the cavity must be roughly greater than or equal to the decay rate of the cavity. In our case, the material gain has been characterized by Inplane Photonics' EDWA device performance and given to us in the form of a maximum modal gain of 0.6 dB/cm when pumped at 1480 nm. Assuming an overlap factor of approximately unity, the result of Appendix can be used to find that our material has a quality factor of $Q_{Er, material}$≈−4.25×$10^5$, where the negative sign indicates gain. Based on previous passive device performance, a target loaded quality factor of 1.5×$10^6$ is reasonable. Thus, the energy overlap with the active region must be $\Gamma_{Er}$≧0.3 as a design goal.

As the cladding material is meant to be deposited over the surface of the microdisks and microrings described in Section, $\Gamma_{Er}$ can be modified in two basic ways: the deposited erbium-doped cladding thickness and the buffer layer thermal oxidation time. The deposited cladding should be thick enough to capture most of the otherwise evanescent field outside the core region but not so thick that fiber taper probing becomes impractical. Designing the modes such that roughly 1-10% of the energy is evanescent is a sufficient guiding principle in most cases. The buffer layer thickness should be chosen such that the silicon surfaces are adequately protected from the environment prior to erbium-doped cladding deposition. In addition, the buffer layer should also be thick enough to act as an adhesion layer and provide strain relief for the PVD material. As the optimal ring designs are very "disk-like" (i.e. the width of the ring is large enough such that the inner-etch placement is inconsequential), the following analysis will focus on the conceptually simpler case of an undercut silicon disk.

Figure 10A:
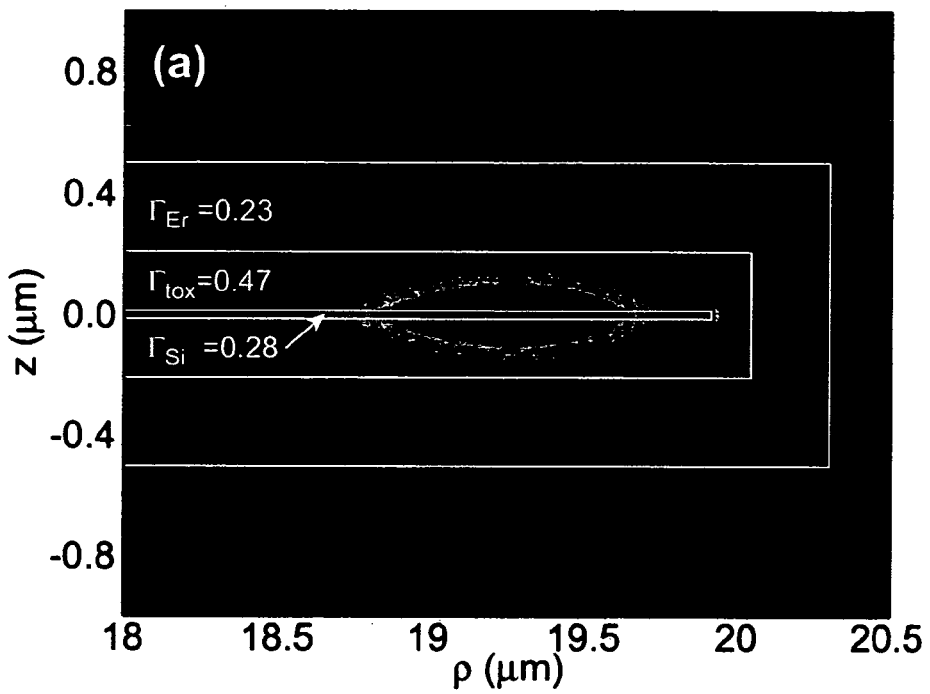
FIGS. 10A and 10B show FEM simulations of TE polarized Er-doped cladding laser modes at 1550 nm for various buffer layer thermal oxidation times. Starting disk parameters were: R=20 μm radius, $h_{si}$=195 nm, $h_{Er}$=300 nm, $t_{BOX}$=3 μm.
Figure 10B:
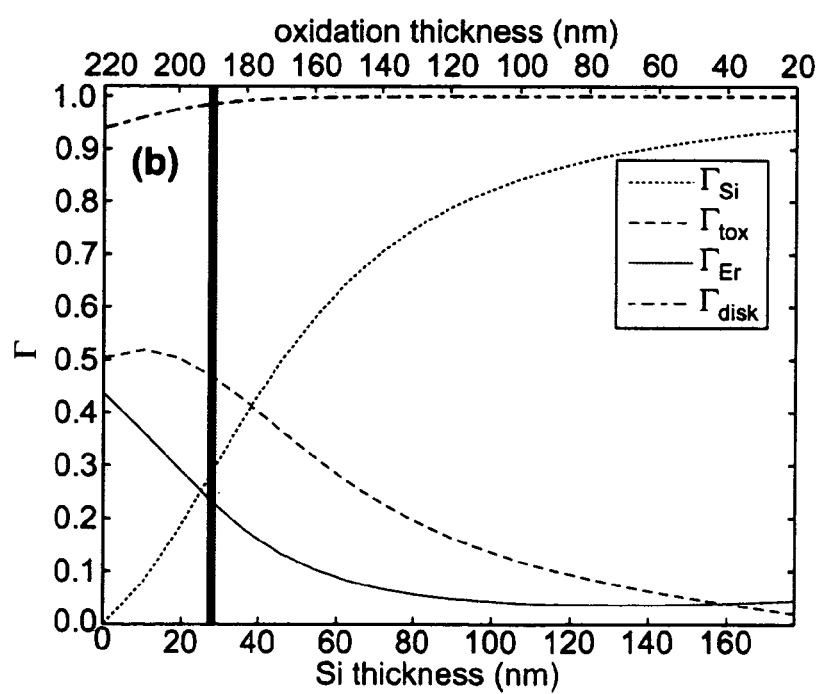
Figure 11:
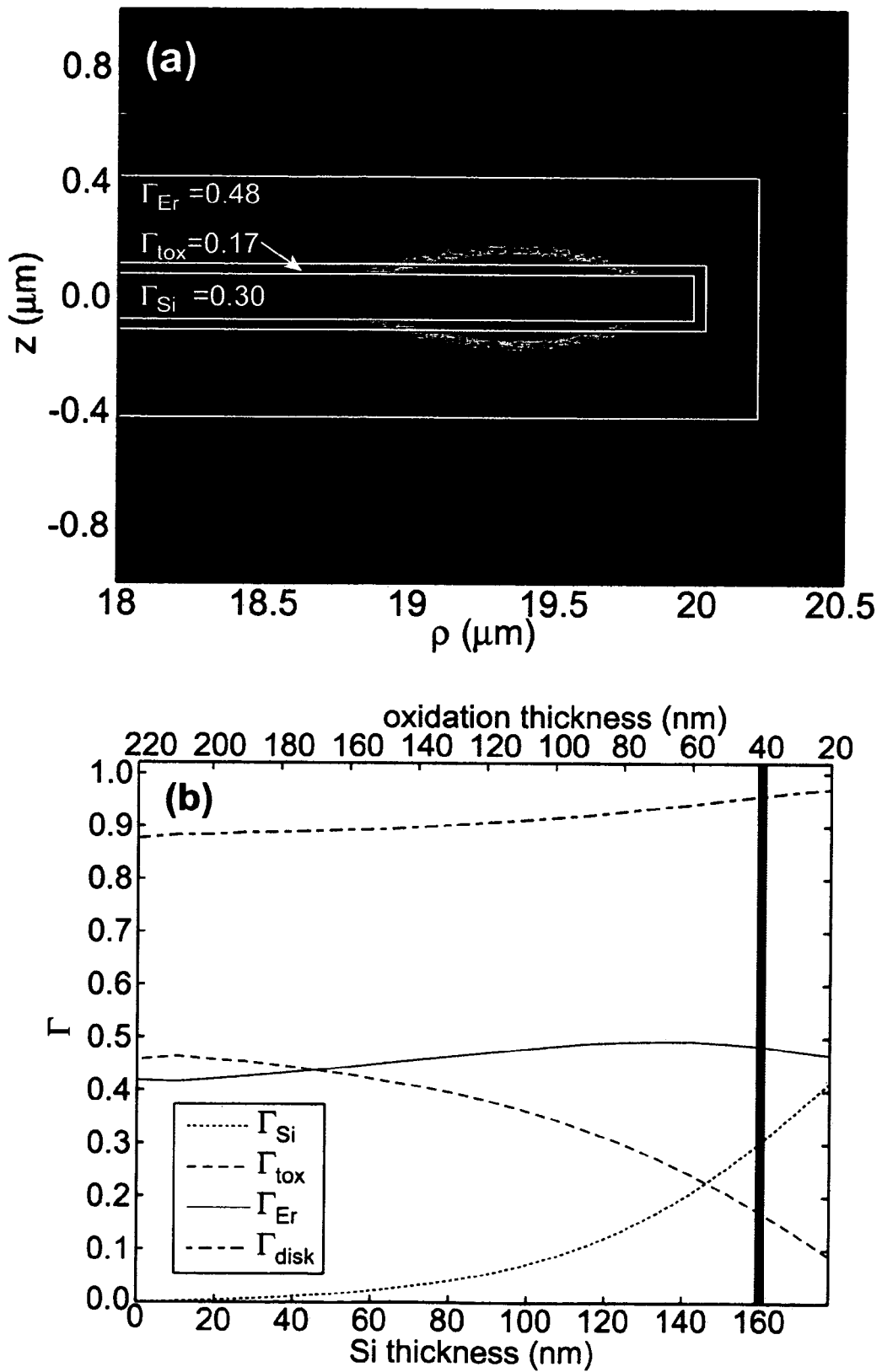
FIG. 11 shows FEM simulations of TM polarized Er-doped cladding laser modes at 1550 nm for various buffer layer thermal oxidation times. Starting disk parameters were: R=20 μM radius, $h_{si}$=195 nm, $h_{Er}$=300 nm, $t_{BOX}$=3 μm. (a) Spatial dependence of $|E(p,z)|^2$ for $\Gamma_{Si}$=0.30 (highlighted by gray bar in (b)). (b) Fraction of electric energy in each dielectric component versus buffer layer thickness (and equivalent remaining silicon core).

FIGS. 10A, 10B, 11 and 12 show the results of FEM simulations for Er-doped cladding laser modes at 1550 nm for various buffer layer thermal oxidation times. The starting disk was chosen to be R=20 μm made from an SOI wafer with 195 nm thick Si device layer atop a 3 μm thick BOX. Thus, the undercut disk was modeled as a floating 195 nm thick Si disk floating 3 μm above an Si substrate. The index of the Er-doped cladding was assumed to be equal to that of the thermal oxide, $n_{tox}=n_{Er}=1.45$. Parts (a) of FIGS. 10A, 10B and 11 show TE and TM mode profiles for the exemplary case of ~30% of the electric energy residing in the silicon core. Here, $|E(p,z)|^2$ was chosen to represent the mode profile as opposed to electric energy density in order to provide a more visually continuous profile throughout the different dielectrics where $n^2(p,z)$ differs by up to an order of magnitude.

Figure 12:
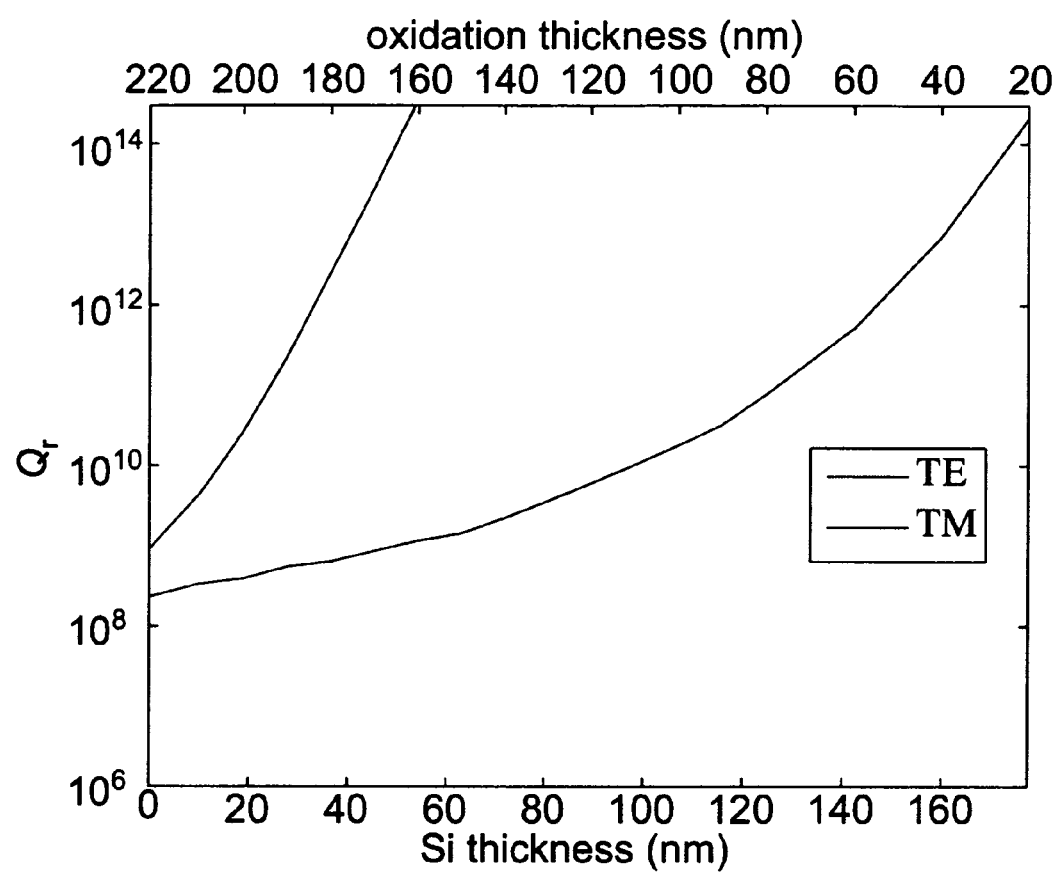
FIG. 12 shows FEM simulation of radiation Q versus the thermal oxide buffer layer thickness (and equivalent remaining silicon core) for A0 fixed at 1550 nm. Starting disk parameters were: R=20 μm radius, $h_{Si}$=195 nm, $h_{Er}$=300 nm, $t_{BOX}$=3 μm.

FIG. 10B and Part (b) of FIG. 11 plot the fraction of electric energy in the silicon core, buffer layer, Er-doped cladding, and the sum of the three components (labeled as: $\Gamma_{Si}$, $\Gamma_{tox}$, $\Gamma_{Er}$, $\Gamma_{disk}$). FIG. 12 plots the radiation quality factor, $Q_r$, for both the TE and TM case.

As increasing the thermal oxidation time increases the buffer layer thickness, $h_{tox}$, while simultaneously consuming 44% of the oxide's thickness in silicon per surface, the simulations specify $h_{tox}$ and then reduce $h_{Si}$ by the commensurate $2 \times 0.44 \times h_{tox}$. The Er-doped cladding thickness was fixed at 300 nm which allowed roughly 1-10% of the electric energy to exist outside the disk, as shown by the black dash-dot $\Gamma_{disk}$ in FIGS. 10B and 11(b). Measurements on some samples indicate that the experimental fractional PVD coverage on an undercut disk is roughly 0.65 for both the sidewalls and bottom surface when compared to the top surface which has the whole hemisphere of deposition solid-angles. However, separation into TE-like and TM-like modes requires that the disk possesses a mirror symmetry about its vertical center. When this mirror symmetry is broken, accidental degeneracies between higher radial order "TE" modes and lower radial order "TM" modes of the same azimuthal number exist and result in mode mixing from anti-crossings. As this study's intention was to follow a single family of modes at a fixed wavelength while the oxidation time is varied, occasional anti-crossing would inevitably occur. Thus, a small approximation has been made by taking the fractional PVD coverage on the side to be a realistic 0.65 while the fractional bottom coverage was raised to unity in order to preserve the mirror symmetry. The silicon substrate provides an inconsequential amount of mode mixing for the ultra-high-Q modes under consideration.

The overlap factors present in FIGS. 10A and 10B illustrate a highly core-guided mode for thick silicon (thin buffer layers), which begins a quick transition to a silica cladding-guided mode for $h_{Si} \gtrsim 60$ nm. Notably, the TE polarized modes have a very poor overlap with the active region until the Si layer becomes extremely thin, $h_{Si} \gtrsim 30$ nm (shown in FIG. 10A). From a technological standpoint, a TE polarized mode requires that the Si thickness to be controlled better than ±1 nm to achieve a ±0.01 precision in the relevant overlap factors. The most striking contrast between the TE and TM disk modes of FIGS. 10A, 10B and 11 is an overarching theme of this thesis: the TM polarization's increased overlap with the glass cladding for all parameter space. Intuitively, the disk's parameters have been chosen so that the TM mode of the Si core is just beginning to approach the traditional "cut-off" point. As a consequence, the otherwise evanescent tails readily assume the field-distribution of silica-cladding guided modes where they enjoy an extended presence as a high-Q resonance (see FIG. 12). With just 20 nm of buffer oxide present, the TM mode has a 47% overlap with the Er-doped cladding, which remains nearly constant as the silicon core is removed. This nearly constant erbium overlap drastically relaxes the tolerances necessary to achieve an Er-doped cladding silicon laser because the oxidation time can be tuned independently to optimize other design constraints, such as $Er^{3+}$ diffusion or strain-induced concentration quenching.

In the limit of total oxidation, both polarizations converge to similar figures of merit. This convergence is due to the fact that the resulting all-silica disk is approximately a wavelength in the material thick where polarization dependent effects are minimal. Total oxidation also sets a lower limit on the radius of the simulated disk; shown in FIG. 12, the radius of the disk was chosen such that $Q_r$ would be larger than $10^8$ for all buffer layer thicknesses. For either polarization, it is expected that leaving roughly 30-50% of the electrical energy in the silicon will be ideal in order to facilitate electrical tuning on non-undercut, partially etched structures.

Figure 13:
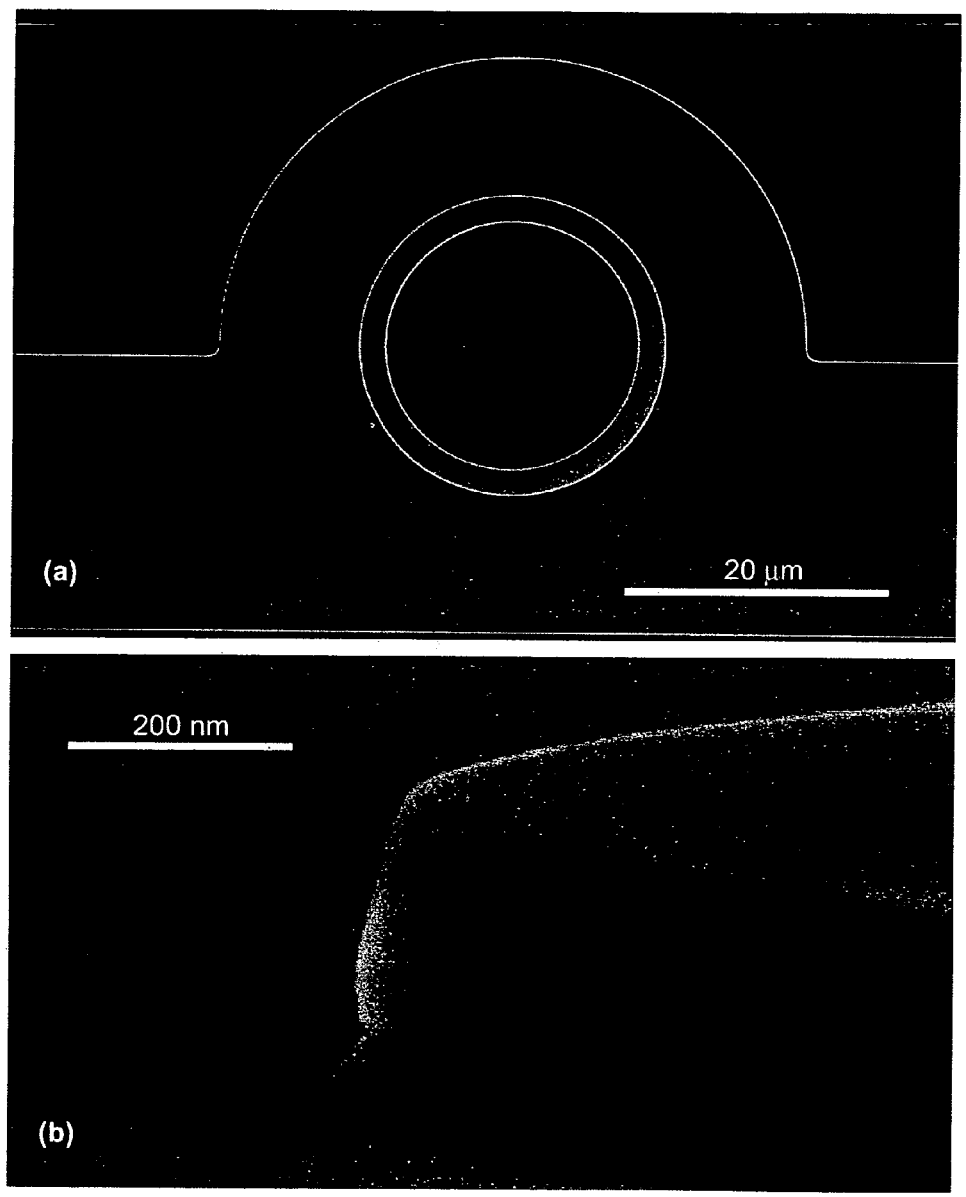
FIG. 13 shows SEM images of rings after the final chemical treatments and 30 nm thermal oxidation. (a) Top-view of a 20 μm diameter, 2 μm width ring. (b) Side-view showing smooth ring sidewalls and a slight BOX undercut due to the final chemical treatment.
Figure 14:
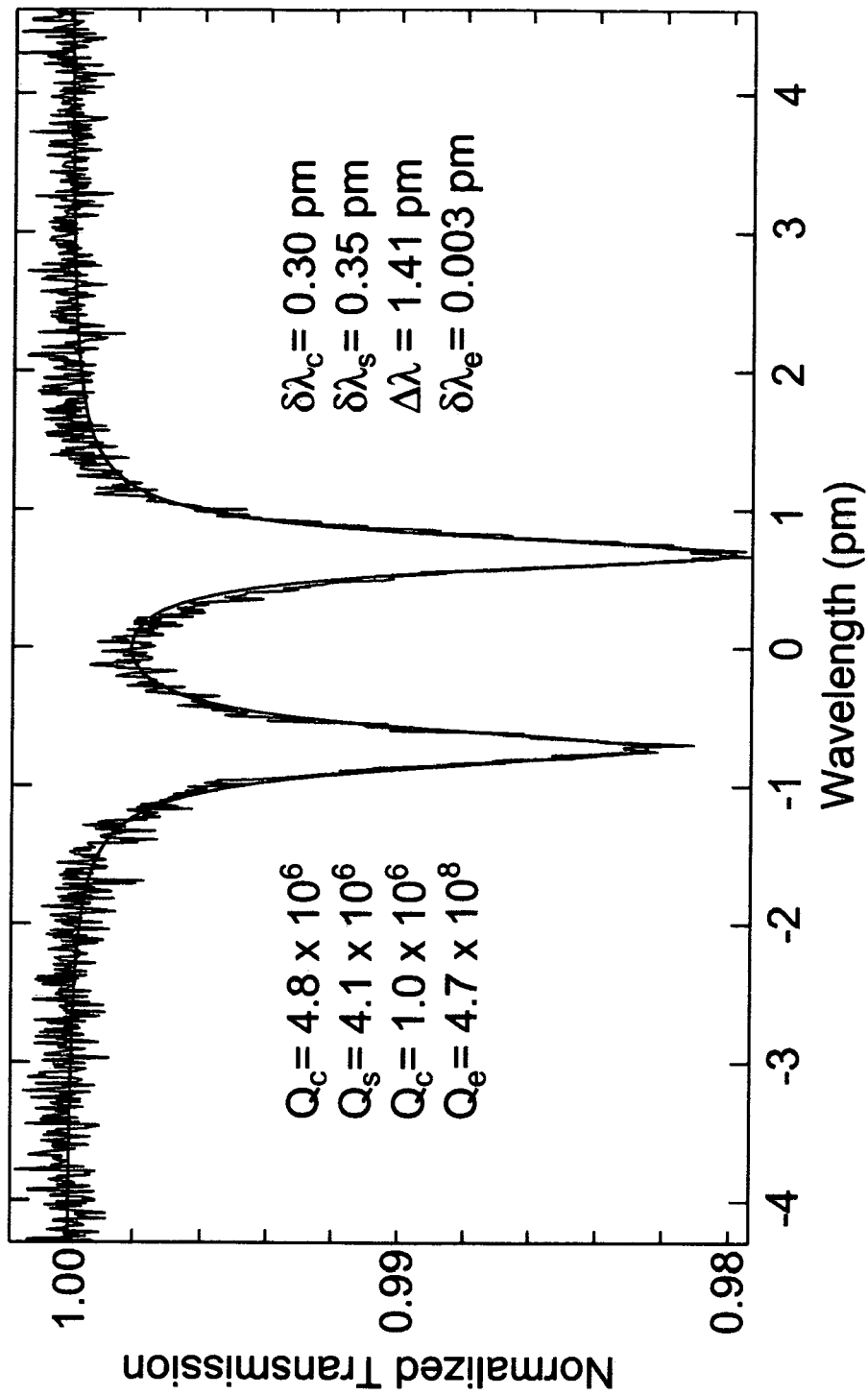
FIG. 14 shows the transmission spectrum of a high-Q mode at $\lambda_0$=1428.7 nm on a 80 μm diameter, 2 μm width ring after final chemical treatments and 30 nm thermal oxidation.

Turning now to fabrication of the HySOI lasers, a series of both undercut microdisks and non-undercut microrings were fabricated utilizing two different SOI wafers commercially available from SOITEC as samples. The first wafer consisted of a 217 nm thick device layer (p-type, 14-20 Ω·cm resistivity, <100> atop of a 2 μm $SiO_2$ BOX and was used for thicker silicon microdisks, whereas the second wafer consisted of 195 nm thick device layer atop a 3 μm $SiO_2$ BOX and was used for thin silicon microdisks as well as non-undercut microrings. A combination of e-beam lithography, ICP/RIE etching, and wet chemical treatments were utilized in order to prepare microdisks and microrings with clean hydrogen-passivated surfaces immediately before growing a range of thermal oxide buffer layers on the various samples. 217 nm thick device layers undercut microdisks with 5-10 μm radii were prepared with {20, 40, and 60} nm thermally oxidized buffer layers. The thermal oxide was grown at 1000° C. immediately followed by a 4.5 hour $N_2$ anneal where the temperature was slowly ramped down to 400° C. during the final 1.5 hours. A similar procedure at 1100° C. was used to completely oxidize a 195 device layer thickness sample consisting of 10-40 μm radii undercut microdisks. A final non-undercut microring sample shown in FIG. 13 consisting of a 2 D array of 10-40 μm radii and 1-2 μm widths was also prepared from the 195 nm thick Si material and had a 30 nm thermal oxide cap grown on the top. The slight undercut visible in FIG. 13(b) is due to the repeated Piranha oxidations and HF dips used to chemically passivate the surface prior to thermal oxidation.

The 20 nm cap silicon disk, the fully oxidized disk, and the microrings were then tested with a dimpled fiber taper probe in order to ensure the buffer layer successfully preserved the high-Q of these structures. The 20 nm cap silicon disks had average measured linewidths of 0.8-1.2 pm, corresponding to Q—1-2 million. The fully oxidized sample was tested at both 1250 and 1460 nm ranges, both yielding extremely consistent linewidths of 0.4-0.5 pm ($Q \sim 3 \times 10^6$) across the tunable laser ranges. Unfortunately, the largest fully oxidized disks suffered small amounts of strain-induced "flowering" owing to the three-dimensional thermal oxidation problem. This "flowering" is a general limitation of undercut disks and highlights the technological need for planar structures to be engineered in the future. The microrings proved difficult to test with a fiber taper probe because of the large phase mismatch picked up by the extra dielectric beneath the Si core guided modes. However, with the taper in contact, the coupling depths were more than adequate to assess the devices' optical loss characteristics. Figure shows a transmission spectrum of a high-Q mode at $\lambda_0 = 1428.7$ nm on a 80 μm diameter, 2 μm width ring after final chemical treatments and 30 nm thermal oxidation. The measured quality factor of $4.8 \times 10^6$ ($\alpha < 0.1$ dB/cm) represents the highest quality factor for any planar microresonator to date. Reproducing Q's found previously only in relatively thick and undercut Si disks shows the incredible promise of future planar high-Q silicon microresonator work as higher effective-index probe and integrated coupling waveguide are utilized.

After characterizing the passive devices, the samples were placed in Gelpaks®, sealed inside triple zip-locking bags with cleanroom tape, and shipped to Inplane Photonics in South Plainfield, N.J. for further processing. At Inplane, the samples underwent further Piranha cleans in order to remove any adventitious organic contaminants before being rinsed in deionized (DI) $H_2O$, isopropanol, and $N_2$ dried. All samples were mounted inside the PVD chamber and coated at the same time with 300 nm of multi-component silica glass doped with $\sim 1$–$2 \times 10^{20}$ cm$-3$ of erbium. In addition, an 875° C. anneal in an $O_2$ ambient was then used to activate the $Er^{3+}$ ions in the host matrix.

Figure 15:
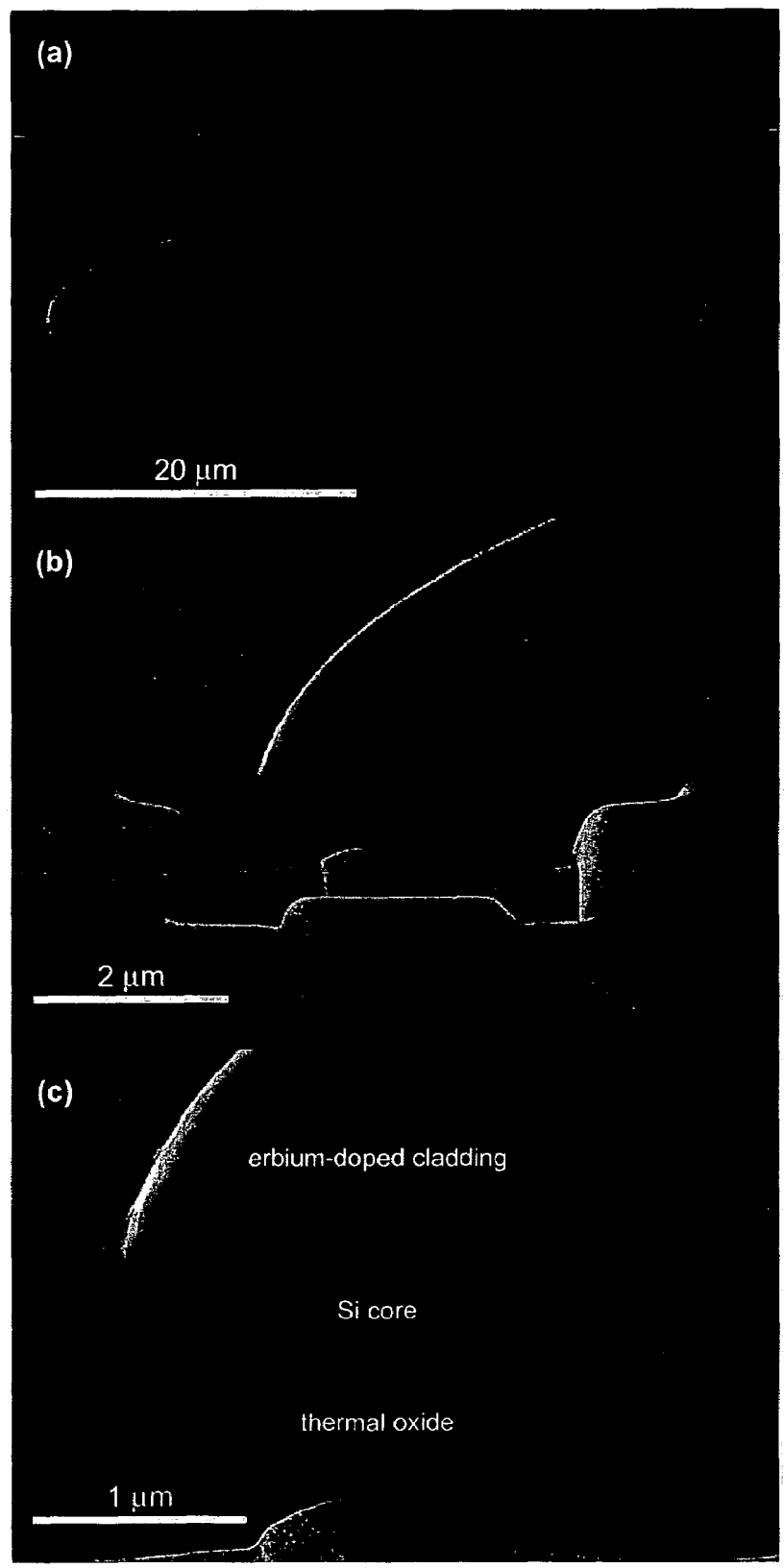
FIG. 15 shows SEM micrographs of silicon rings after chemical treatments, 30 nm thermal oxidation, and 300 nm erbium-cladding deposition. (a) 20 μm radius, 1 μm width ring. (b) 2 μm width ring after FIB cross sectioning. (c) Higher magnification view of cross section where silicon core, thermal oxide and erbium oxide are clearly visible.

FIG. 15 shows SEM micrographs of the previously described silicon rings after chemical treatments, 30 nm thermal oxidation, and 300 nm erbium-cladding deposition. All images were taken at 5 kV in order to enhance the materials contrast. FIG. 15(a) shows a broad view of a 20 μm radius, 1 μm width microring. The Er-cladding deposition can be seen to be smooth and uniform across the resonator. FIG. 15(b) shows a 2 pm width ring after FIB cross sectioning, and FIG. 15(c) is a higher magnification view of the cross section where the silicon core, thermal oxide and erbium oxide are clearly visible. The darkest regions immediately around the Si core are the 30 nm thermal oxide buffer layer on the top and buried oxide layer on the bottom. In general, the deposited glass appears to have no discernable defects on the top surfaces of the rings or dry etched planes. However, small deposits of cladding material can be seen in the trough formed by the HF chemical treatments. Additionally, the etch roughness appears to have been decorated by the PVD glass, indicating that further optimization of the deposition would be necessary for ultra-low loss planar structures. Alternatively, future planar resonators could be fabricated with integrated bus waveguides. This would allow the cladding layers to be deposited thick enough such that the rough cladding-air interface would not be seen by the optical modes.

The above described successful reduction in optical losses with wet chemistries is consistent with the wealth of previous research done on the electronic properties of silicon surfaces. The effective free-carrier lifetime can be used as an indirect measure of the surface absorption and a "passivation layer" can be used to provide high effective lifetimes in order to protect the fragile Si interface. Silicon photovoltaics fabrication uses various passivation layers to be deposited over the silicon surfaces in order to preserve the lifetime of the free-carriers as well as to form an anti-reflection coating over the solar cell. Several of the latest in solar cell technologies for passivation of the Si interface states were employed to optically passivate and protect the microdisk's top surfaces. It was found that a short thermal oxidation followed by a long high temperature N2 anneal was most effective at preserving the high quality factors, indicating that the $Si/SiO_2$ interface provides adequate dangling bond passivation even without the presence of hydrogen. This finding suggests that while effective at protecting the interface states, more research is needed in order to understand the underlying mechanisms of optical loss at dielectric interfaces with silicon. This section will compare the previously successful electronic passivation layers with our empirical study of those same layers in the optical domain.

Schmidt et al. found that PECVD $SiN_x$ passivation layers with or without an underlying thin thermal oxide layer achieved effective free-carrier lifetimes of $\sim 1$ ms, comparable to the best passivation schemes to date. See, J. Schmidt, M. Kerr, A. Cueva, "Surface passivation of silicon solar cells using plasma-enhanced chemical-vapour-deposited SiN films and thin thermal SiO2/plasma SiN stacks," Semiconductor Science and Technology (16) 167-170, 2001. The optimized PECVD recipe for $SiN_x$ layers was found to result in nearly stoichiometric $Si_3N_4$ films and was generated through a direct parallel-plate reactor system. Furthermore, they found that the effective lifetime increased further for the first 50 min of a 400° C. anneal in forming gas (5% $H_2$, 95% $N_2$) before eventually decaying with increased forming gas annealing (FGA). As the effect of ambient hydrogen was found to be negligible, they attributed the increase of lifetime to the large reservoir of hydrogen in the silicon nitride ($\sim 15$–20 at. %) being released during the deposition and anneal. The effective passivation was also found to benefit from an initial thermal oxide, providing a higher quality Si interface, before the $SiN_x$ deposition and concomitant diffusion of hydrogen through the $SiO_2$ to the silicon surface. In a more recent study, McCann et al. found that a 25 nm thick thermal oxide grown at 900° C. followed by a 30 min FGA at 400° C. was sufficient to obtain equally high effective lifetimes. In addition, they found that the lifetimes could be spoiled by a 1 hr high temperature 900-1000° C. $N_2$ anneal and subsequently repaired by another FGA. They attributed this effect to reversibly adding or subtracting hydrogen from the $Si/SiO_2$ interface. See, M. McCann, Klaus Weber, and Andrew Blakers, "Surface Passivation by Rehydrogenation of Silicon-nitride-coated Silicon Wafers," Progress in Photovoltaics: Research and Applications (13) 195-200, 2005.

For understanding this effect, it can be hypothesized that the effective lifetime measurements from the previous references would be good indicators of optical loss at the Si interface. Both PECVD $SiN_x$ and thermal oxide (TOX) layers were tried as encapsulation layers for silicon microdisks. All of the samples for these trials were fabricated from a SOI wafer to have silicon device layers with 5, 7.5, and 10 μm radii microdisks. The devices were tested using a dimpled taper probe wherein a small downward $\sim 70$ μm radius bend is annealed into a tensionable fiber taper probe. All oxidations and anneals were done in a custom built quartz tube oxidation furnace. Electronic grade II $O_2$, $N_2$, and forming gases were plumbed into the 2 inch diameter furnace. Each gas flow rate was independently controlled with mass flow controllers. Typical flow rates inside the approximately three foot long quartz furnace were 0.3 standard liters per minute. Thermal shock to the samples was avoided by using the unheated portion of the furnace tube as a second and intermediate staging area where the samples were allowed to slowly warm-up and cool-down before transfer to the heated portion of the chamber or being removed from the furnace.

Figure 16:
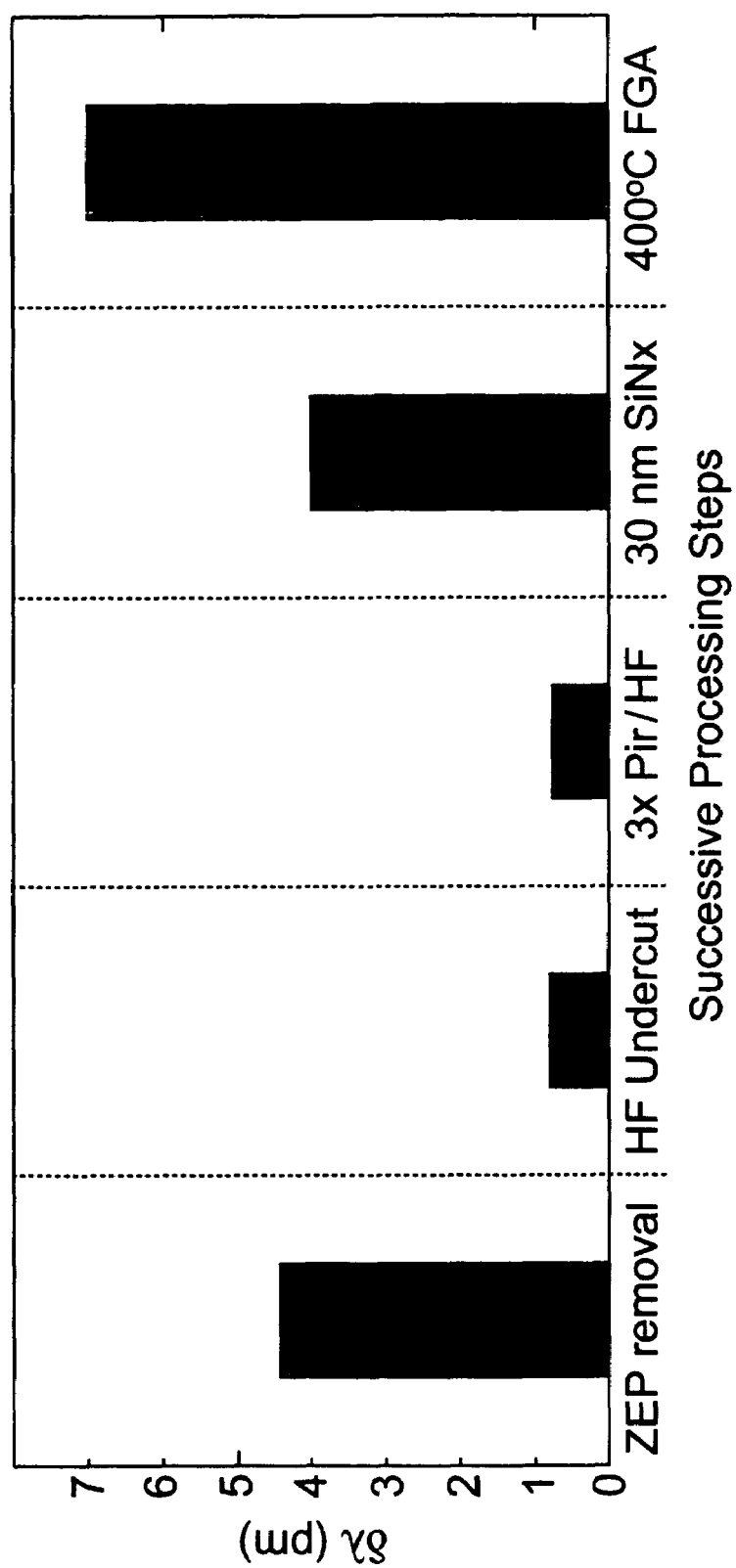
FIG. 16 shows a summary of best linewidths after selected processing steps 5 1-μm radii disks fabricated with a stoichiometric $SiN_x$ encapsulation layer and forming gas anneal.

The first encapsulation trial was done on a sample that had an initial 50 nm $SiN_x$ cap deposited on the surface prior to lithography and etching. After removing the ZEP resist with an hour long Piranha, the sample was tested with a ~1.5 μm diameter dimpled fiber taper probe in the $N_2$ purged testing chamber of Chapter 4. FIG. 16 shows a bar graph summary of the best linewidths at selected intermediate points during the fabrication. Having tested many devices on the sample, the best linewidth after the initial Piranha clean was $\delta\lambda=4.5$ pm. However, after an hour long HF undercut, the linewidths reduced considerably to 0.8 pm. Further wet chemical treatment described in Table 5.3 had no discernible effect on the linewidths.

At this point, a nearly stoichiometric 30 nm thick $SiN_x$ encapsulation was deposited over the wafer. Immediately prior to loading the wafer into the PECVD chamber, an additional 3× Piranha/HF treatment was done on the sample to ensure an exquisitely clean and well-passivated silicon surface. The processing conditions were as follows: a gas chemistry of 450 sccm of 5% $SiH_4/N_2$ and 50 sccm of $NH_3$ was applied to the chamber held at 200 mTorr and 400° C. The gas was cracked with 60 W of the high frequency (13.56 MHz) source. No low frequency source was used in an attempt to suppress deposition damage by ion's oscillating below the ~4 MHz plasma frequency. The losses of the cavities significantly increased to 4 pm, a difference of 3.2 pm. After testing with the "as deposited" silicon nitride cap, the sample underwent a 40 min FGA at 400° C. Subsequent testing revealed that the FGA had further deleterious effects on the samples, where the best linewidth was found to be 7 pm, also shown in FIG. 16.

Assuming a $SiN_x$ index of refraction of 1.9, FEM simulations of the composite resonator show that TM modes possessed 11% of the optical energy inside the $SiN_x$. Thus, if the sources of loss were evenly distributed throughout the $SiN_x$, the material quality factor of the as deposited material would be $Q_{SiN_x,mat} = \Gamma_{SiN_x} \lambda_0/(\delta\lambda_{after} - \delta\lambda_{before}) \approx 5.0 \times 10^4$, or an attenuation coefficient of $\alpha_{SiN_x,mat} = \beta_g/Q_{SiN_x,mat} \approx 7.1$ dB/cm. PECVD deposited material is known to have high relatively high absorption coefficients (1-10 dB/cm) due to Si—H, O—H, N—H bond absorption overtones in the telecommunications wavelength bands. Furthermore, as the FGA anneal would not be expected to harm the Si surfaces, a consistent interpretation of the results shown in FIG. 16 is that any benefits of a hydrogenated silicon surface were overwhelmed by the increased hydrogen content in the bulk SiNx layer. However, pure PECVD Si-rich nitride disks were independently fabricated and tested achieving quality factors $\sim 2 \times 10^5$. Thus it is likely that the PECVD process damaged the high-index silicon surface during the deposition, which would account for the unaccounted for loss.

Figure 17:
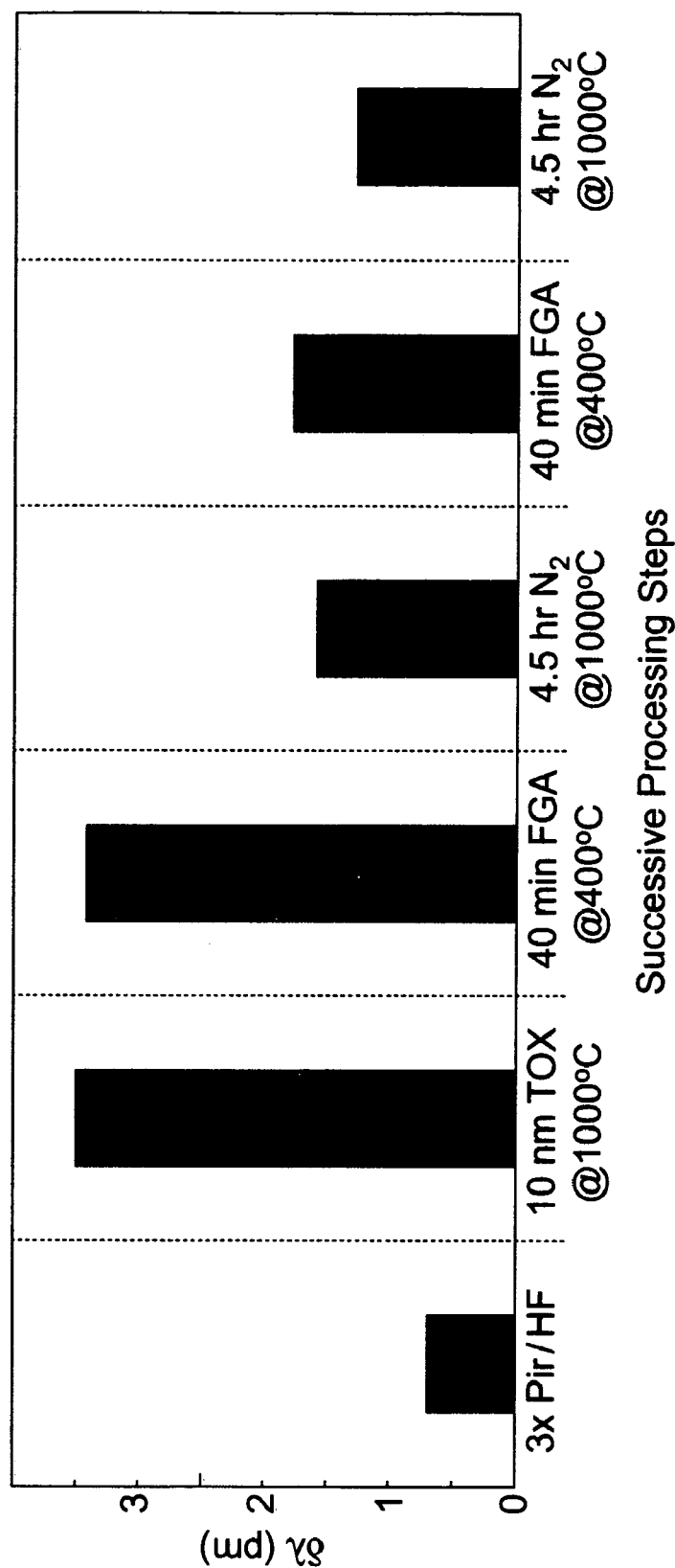
FIG. 17 shows a summary of best linewidths after selected processing steps for 5-10 μm radii disks fabricated with a thermal oxide encapsulation layer along with various annealing trials.

A second sample underwent identical processing as the sample just described, including the deposition of a silicon nitride cap, lithography, dry-etching, ZEP removal, and 3× Piranha/HF treatment. As expected, the measured best linewidth of 0.7 pm was very similar to the previous sample and is shown in FIG. 17. However, this time a 10 nm TOX layer was grown on the Si surface at 1000° C. for 3.1 minutes in an attempt to form a good Si interface with a hydrogen free material. After switching off the $O_2$, the sample was allowed to cool slowly under an $N_2$ ambient for approximately five minutes before retesting. The best linewidth after thermal oxidation was 3.5 pm, a result similar to the silicon nitride cap. However, the same 40 min FGA had virtually no impact on the sample with the thermal oxide cap. A 4.5 hr high temperature anneal in an $N_2$ ambient was found to significantly improve the losses, where the best linewidth was measured to be 1.6 pm. The high temperature anneal consisted of holding the furnace at 1000° C. for 3 hours and then letting the temperature slowly ramp down to 400° C. over the course of the remaining 1.5 hours. Assuming that the high temperature anneal successfully healed the Si interface and bulk TOX, a 40 min FGA was conducted on the sample. The FGA was found to slightly reduce the quality factor of the best resonance, where the linewidth was measured to be 1.8 pm. A second 4.5 hr high temperature anneal drove out the hydrogen from the sample, resulting in a $\delta\lambda=1.2$ pm on the best resonance. This set of four anneals showed that the thermal oxide needed time at high temperature to remove material and surface defects and that the FGA had a marginally degrading effect on the optical losses.

Figure 18:
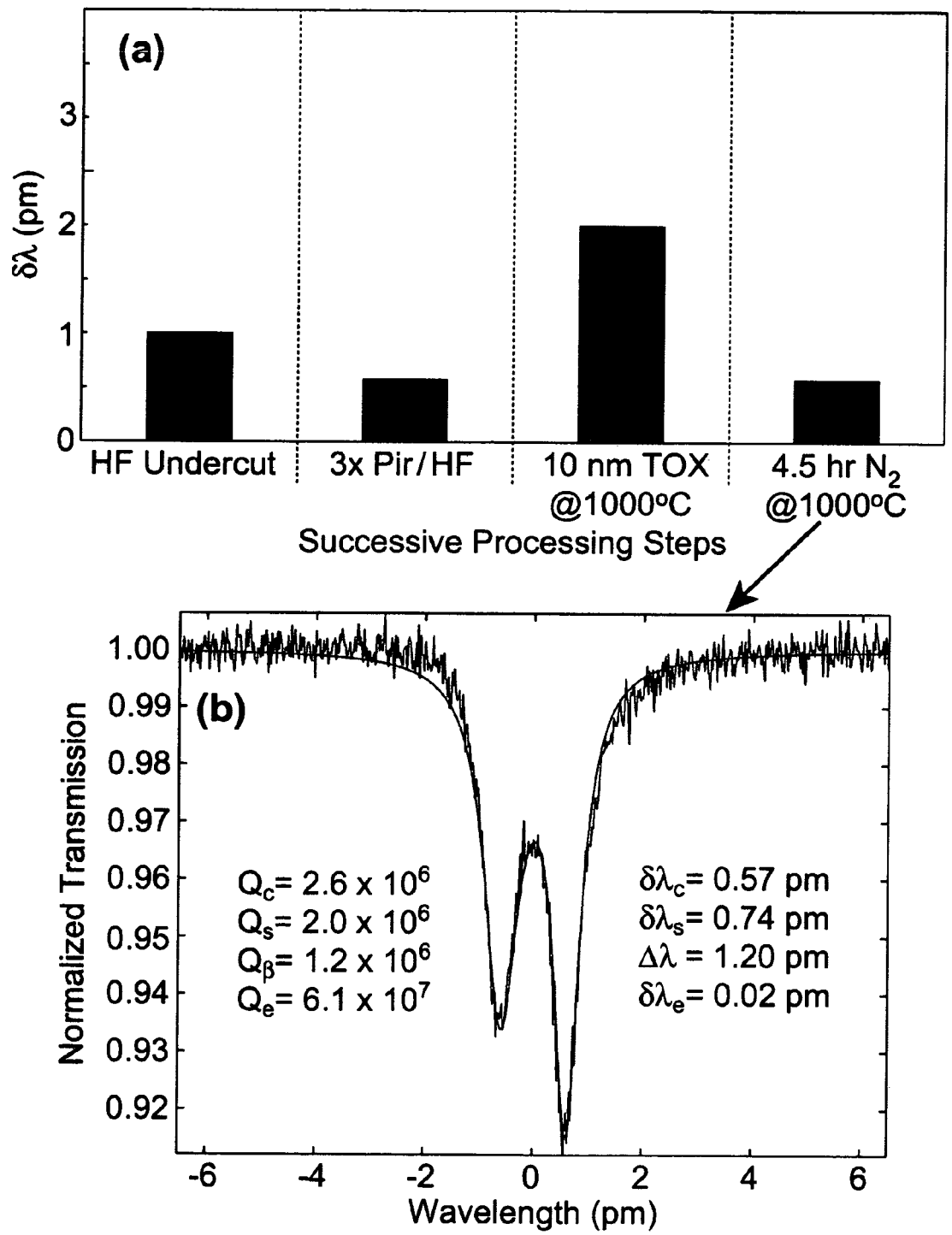
FIG. 18 shows (a) Summary of best linewidths after selected processing steps for 5-10 μm radii disks fabricated without an initial protective cap. This sample also had a thermal oxide encapsulation layer but no FGa. (b) High-resolution transmission spectrum of 1444.2 nm resonance on a 7.5 μm radius disk after the final high temperature anneal.

A third sample was similarly fabricated but did not have an initial silicon nitride cap prior to lithography and dry-etching. After HF undercutting and 3× Piranha/HF treatments, the best linewidths were measured to be 1.0 and 0.6 pm, respectively (shown in FIG. 18(*a*)). The marginal improvement in this case was attributed to: a simplified single material dry-etch and a less damaged top Si surface. The latter was confirmed after an identical 10 nm TOX cap with 5 minute cooldown showed a best linewidth of 2.0 pm, much better than the second sample's 3.5 pm linewidth after oxidation. Omitting any FGA step, a final 4.5 hour high temperature anneal completely healed the Si-interface and bulk silica cap, showing identical linewidths prior to oxidation. FIG. 18(*b*) shows a high-resolution transmission spectrum of the 1444.2 nm resonance on a 7.5 μm radius disk after the final high temperature anneal, along with a doublet model fit. As described in Section 6.3.5, totally oxidized and annealed microdisks had $Q > 3 \times 10^6$. As these disks were most likely surface scattering limited due to their design, quality factors this high indicate that the encapsulating oxide is of extreme quality after high temperature anneals. The thermal oxide encapsulated and non-undercut microrings were observed to have quality factors $\sim 5 \times 10^6$.

The results above on the passivation layer represent the successful encapsulation of the once delicate Si-surfaces, as 10 nm of thermal oxide will completely prevent native or chemical oxide growth during any subsequent fabrication steps. While silicon nitride would have been slightly preferable in terms of chemical resistance, the high quality thermal oxide is a simple and effective method of sealing the disks from environmental contamination while still allowing optical access to the mode's near field. Having also demonstrated this technology on a planar resonator represents a significant milestone in ultra-low-loss silicon photonics technology. Any number of functionalized materials can now be placed as claddings over the resonators, allowing for the technologically viable development of biological/chemical sensors, microlasers, and highly nonlinear devices integrated with electronic circuitry on a silicon chip.

Figure 19:
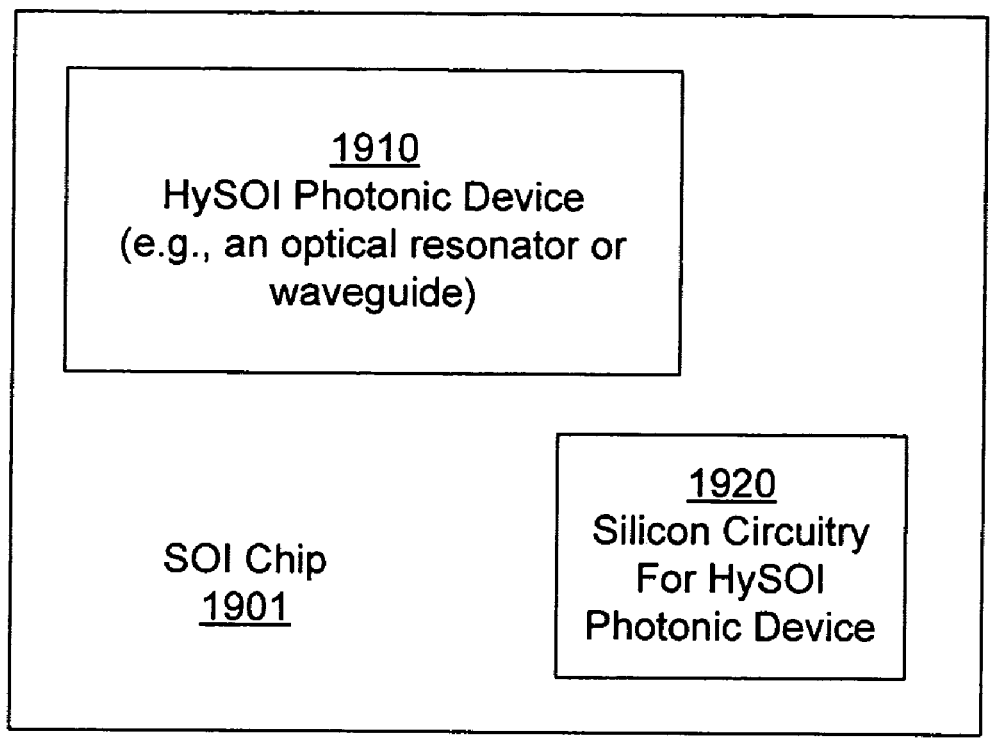
FIG. 19 shows an example of an integrated silicon photonic device using the present HySOI designs.

The above described HySOI structures and devices and their fabrication techniques may be applied to various applications. FIG. 19 illustrates an integrated silicon photonic circuit that includes a SOI chip 1901, a HySOI photonic device 1910 and a silicon IC circuitry block 1920 that are monolithically fabricated on the chip 1901. The silicon IC circuitry block 1920 is designed to provide electrical control or processing for the HySOI photonic device 1910. This integrated silicon photonic circuit may be used to provide various photonic functions by properly configuring the HySOI photonic device 1910. For example, the HySOI photonic device 1910 may be a laser which has an active doped cladding layer over the silicon resonator in the top silicon layer based on either optical excitation or electrical excitation. As another example, the HySOI photonic device 1910 may be an optical modulator where the cladding layer over the silicon resonator or waveguide in the top silicon layer may be made of an electro-optic material or other material whose index may be electrically controlled by the silicon IC circuitry block 1920 so as to modulate the confined or guided light in the top silicon layer. As yet another example, the HySOI photonic device 1910 may be an optical amplifier where the cladding layer over the silicon resonator or waveguide in the top silicon layer is an optical gain cladding layer to amplify the confined or guided light in the top silicon layer.

In other applications, the above described HySOI structures and devices may be used for detecting or analyzing selected biological and chemical substances by using the functional cladding layer over the top silicon layer. In one implementation, a solid phase polymer network may be used to form the entirety or part of the functional cladding layer. The solid phase polymer network can be designed in such a way that, when in contact with vapor phase molecules, the solid phase polymer network comes into a diffusive equilibrium with the vapor phase molecules. This interaction between the solid phase polymer network and various molecules is known and is described in various literatures, e.g., U.S. Pat. No. 6,759,010 entitled "Use of an array of polymeric sensors for varying thickness for detecting analytes in fluids" and the article entitled "Array-based vapor sensing using chemically sensitive, carbon black-polymer resistors" by Lonergan et al. in Chem. Mater, 1996, 8, 2298-2312. In order to accommodate the presence of sorbed molecules, the polymer network swells and this change the cladding of the underlying silicon resonator or waveguide and thus alters the light confined or guided by the underlying silicon resonator or waveguide. The change in the confined or guided light can be measured and processed to extract the information of the sorbed molecules. Both the degree and rate of sorption at the polymer network in the cladding layer may depend upon the species of vapor phase molecule and the chemical composition of the polymer network.

In implementation, the properly chosen polymer network for detecting a specific molecule may be formed as a thin layer in contact with or spatially separated but optically close to the silicon waveguiding or resonant structure in order to evanescently interact with the guided or confined light. The properties of diffusive equilibrium can be exploited to create an optical system sensitive to the presence of various vapor phase molecules, including, but not limited to, organic molecules, hydrogen sulfide ($H_2S$), or other biomolecules. The swelling of such a thin-film polymer network contiguous or optically close to a waveguiding or resonant optical element and in contact with a supply of vapor phase molecules results in a shifting of an electromagnetic boundary of the system and an overall change in dielectric function. Such changes result in concomitant changes in the propagation or resonant frequency of the optical system, and/or the transmission and reflection properties of the optical system. These vapor and network dependent responses (both transient and steady state) of the optical system can be correlated with the concentration and species of the vapor phase molecules, composing a sensor-device. The above sensing technique may also be implemented in an array of various polymer networks contiguous with or optically close to a corresponding array of waveguiding or resonant structures, the transient and steady state responses of the optical systems upon exposure to various organic and inorganic molecules can be correlated to identify both concentration and species of vapor phase molecules.

While this specification contains many specifics, these should not be construed as limitations on the scope of an invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

In summary, only a few implementations are disclosed. However, it is understood that variations and enhancements may be made.

What is claimed is:

1. A device, comprising:
a silicon substrate;
an insulator layer formed on the silicon substrate;
a silicon resonator separated from the silicon substrate and in contact with the insulator layer, the silicon resonator comprising a silicon resonator surface that is not in contact with the insulator layer and includes at least a portion being parallel to the silicon substrate or forming an acute angle with respect to the silicon substrate, the silicon resonator configured and operable to confine light in a resonator mode that has a portion extending outside the silicon resonator at the silicon resonator surface; and
a cladding layer comprising at least a portion directly in contact with or near the silicon resonator surface to interact with the confined light, wherein the cladding layer comprises an optical gain medium operable to emit and amplify light.

2. The device as in claim 1, wherein the optical gain medium comprises materials which emit and amplify light in response to electrical injection.

3. The device as in claim 1, wherein the optical gain medium comprises materials which emit and amplify light in response to optical excitation.

4. The device as in claim 1, wherein the cladding layer includes a layer of biological or chemical receptors.

5. The device as in claim 1, wherein the cladding layer includes a nonlinear optical material.

6. The device as in claim 1, wherein the silicon resonator is a silicon ring resonator.

7. The device as in claim 1, wherein the silicon resonator is shaped as a solid disk.

8. The device as in claim 7, wherein
the insulator layer formed on the silicon substrate is patterned to include a pedestal to support the silicon resonator and to expose a portion of a bottom silicon resonator surface.

9. The device as in claim 8, wherein
the cladding layer covers the exposed portion of the bottom silicon resonator surface.

10. A device, comprising:
a silicon substrate;
an insulator layer formed on the silicon substrate;
a silicon resonator separated from the silicon substrate and in contact with the insulator layer, the silicon resonator comprising a silicon resonator surface that is not in contact with the insulator layer and includes at least a portion being parallel to the silicon substrate or forming an acute angle with respect to the silicon substrate, the silicon resonator configured and operable to confine light in a resonator mode that has a portion extending outside the silicon resonator at the silicon resonator surface; and
a cladding layer comprising at least a portion directly in contact with or near the silicon resonator surface to interact with the confined light, wherein the cladding layer is an optical gain medium operable to emit and amplify light, wherein the optical gain medium:
is operable to emit and amplify light in response to electrical injection; and
comprises a III-V semiconductor material.

11. A device, comprising:
a silicon substrate;
an insulator layer formed on the silicon substrate;
a silicon resonator separated from the silicon substrate and in contact with the insulator layer, the silicon resonator comprising a silicon resonator surface that is not in contact with the insulator layer and includes at least a portion being parallel to the silicon substrate or forming an acute angle with respect to the silicon substrate, the silicon resonator configured and operable to confine light in a resonator mode that has a portion extending outside the silicon resonator at the silicon resonator surface; and
a cladding layer comprising at least a portion directly in contact with or near the silicon resonator surface to interact with the confined light, wherein the cladding layer is an optical gain medium operable to emit and amplify light, wherein the optical gain medium:
is operable to emit and amplify light in response to electrical injection; and
comprises a Si—Ge heterostructure material.

12. A device, comprising:
a silicon substrate;
an insulator layer formed on the silicon substrate;
a silicon resonator separated from the silicon substrate and in contact with the insulator layer, the silicon resonator comprising a silicon resonator surface that is not in contact with the insulator layer and includes at least a portion being parallel to the silicon substrate or forming an acute angle with respect to the silicon substrate, the silicon resonator configured and operable to confine light in a resonator mode that has a portion extending outside the silicon resonator at the silicon resonator surface; and
a cladding layer comprising at least a portion directly in contact with or near the silicon resonator surface to interact with the confined light, wherein the cladding layer is an optical gain medium operable to emit and amplify light, wherein the optical gain medium:
is operable to emit and amplify light in response to electrical injection; and
comprises an embedded silicon nanocrystal material.

13. A device, comprising:
a silicon substrate;
an insulator layer formed on the silicon substrate;
a silicon resonator separated from the silicon substrate and in contact with the insulator layer, the silicon resonator comprising a silicon resonator surface that is not in contact with the insulator layer and includes at least a portion being parallel to the silicon substrate or forming an acute angle with respect to the silicon substrate, the silicon resonator configured and operable to confine light in a resonator mode that has a portion extending outside the silicon resonator at the silicon resonator surface; and
a cladding layer comprising at least a portion directly in contact with or near the silicon resonator surface to interact with the confined light, wherein the cladding layer comprises an optical gain medium operable to emit and amplify light, wherein the optical gain medium is:
operable to emit and amplify light in response to optical excitation; and
doped with rare earth ions.

14. A device, comprising:
a silicon substrate;
an insulator layer formed on the silicon substrate;
a silicon resonator separated from the silicon substrate and in contact with the insulator layer, the silicon resonator comprising a silicon resonator surface that is not in contact with the insulator layer and includes at least a portion being parallel to the silicon substrate or forming an acute angle with respect to the silicon substrate, the silicon resonator configured and operable to confine light in a resonator mode that has a portion extending outside the silicon resonator at the silicon resonator surface; and
a cladding layer comprising at least a portion directly in contact with or near the silicon resonator surface to interact with the confined light, wherein the cladding layer comprises an optical gain medium operable to emit and amplify light, wherein the optical gain medium is:
operable to emit and amplify light in response to optical excitation;
doped with rare earth ions; and
an Er-doped glass material.

15. A device, comprising:
a silicon substrate;
an insulator layer formed on the silicon substrate;
a first cladding layer in contact with the insulator layer;
a silicon resonator separated from the silicon substrate and from the insulator layer, the silicon resonator comprising a first silicon resonator surface and a second silicon resonator surface that include at least portions being parallel to the silicon substrate or forming an acute angle with respect to the silicon substrate, wherein the first silicon resonator surface is in contact with the first cladding layer;
a second cladding layer comprising at least a portion directly in contact with or near the second silicon resonator surface,
wherein
the silicon resonator is configured and operable to confine light in a resonator mode that has a portion extending outside the silicon resonator at the first and second silicon resonator surfaces; and
the first and second cladding layers interact with the confined light and comprise an optical gain medium operable to emit and amplify light.

* * * * *

UNITED STATES PATENT AND TRADEMARK OFFICE
CERTIFICATE OF CORRECTION

PATENT NO. : 7,528,403 B1  
APPLICATION NO. : 11/411447  
DATED : May 5, 2009  
INVENTOR(S) : Matthew Borselli, Thomas J. Johnson and Oskar Painter Page 1 of 1

It is certified that error appears in the above-identified patent and that said Letters Patent is hereby corrected as shown below:

At page 24, column 1, line 8, please include the following paragraphs:

--Statement Regarding Federally Sponsored Research

This invention was made with government support under Grant No. HR0011-04-1-0054 awarded by Defense Advanced Research Projects Agency (DARPA). The government has certain rights in the invention.--

Signed and Sealed this

Seventh Day of December, 2010

David J. Kappos  
*Director of the United States Patent and Trademark Office*